US011996572B2

(12) United States Patent
Lee et al.

(10) Patent No.: US 11,996,572 B2
(45) Date of Patent: May 28, 2024

(54) BATTERY MODULE

(71) Applicant: SAMSUNG SDI CO., LTD., Yongin-si (KR)

(72) Inventors: Junhyung Lee, Yongin-si (KR); Daeyeop Park, Yongin-si (KR); Heonhee Kim, Yongin-si (KR); Jisoon Lim, Yongin-si (KR); Sunghoon Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/646,623

(22) Filed: Dec. 30, 2021

(65) Prior Publication Data
US 2022/0209348 A1    Jun. 30, 2022

(30) Foreign Application Priority Data

Dec. 31, 2020  (KR) .................. 10-2020-0189843
Dec. 30, 2021  (KR) .................. 10-2021-0192904

(51) Int. Cl.
*H01M 50/209*    (2021.01)
*H01M 10/6556*   (2014.01)
*H01M 50/186*    (2021.01)

(52) U.S. Cl.
CPC ..... *H01M 50/209* (2021.01); *H01M 10/6556* (2015.04); *H01M 50/186* (2021.01)

(58) Field of Classification Search
CPC ........... H01M 50/209; H01M 10/6556; H01M 50/186
See application file for complete search history.

(56) References Cited

U.S. PATENT DOCUMENTS 11,024,896 B2    6/2021  Yoon et al.
2012/0312614 A1  12/2012 Fujiwara et al.
(Continued)

FOREIGN PATENT DOCUMENTS

CN    207967112 U    10/2018
JP    4484128 B2     6/2010
(Continued)

OTHER PUBLICATIONS

EPO Extended European Search Report dated Jul. 27, 2022, issued in corresponding European Patent Application No. 21218466.7 (7 pages).
(Continued)

*Primary Examiner* — Matthew T Martin
*Assistant Examiner* — Taylor Harrison Krone
(74) *Attorney, Agent, or Firm* — Lewis Roca Rothgerber Christie LLP

(57) ABSTRACT

A battery module includes: one or more cell assemblies; a main housing comprising a main boundary portion surrounding an accommodation space in which the one or more cell assemblies are positioned; a first plate comprising a first boundary portion coupled with the main boundary portion and a first exposure portion exposed from the main boundary portion and defining a side of a cooling fluid passage for cooling the accommodation space; and a second plate facing the first plate and comprising a second boundary portion coupled with the main boundary portion and a second exposure portion exposed from the main boundary portion and defining an other side of the cooling fluid passage.

14 Claims, 13 Drawing Sheets

(56) References Cited

U.S. PATENT DOCUMENTS

| | | | |
|---|---|---|---|
| 2018/0154754 A1* | 6/2018 | Rowley | B60K 1/04 |
| 2021/0234187 A1* | 7/2021 | Hamaoka | H01M 50/186 |
| 2021/0351455 A1 | 11/2021 | Kim et al. | |
| 2022/0013821 A1 | 1/2022 | Tong | |
| 2022/0094000 A1* | 3/2022 | Tamaru | H01G 11/12 |
| 2023/0099554 A1* | 3/2023 | Jo | H01M 10/627 |
| | | | 429/433 |

FOREIGN PATENT DOCUMENTS

| | | |
|---|---|---|
| KR | 10-2013-0057530 A | 6/2013 |
| KR | 10-2019-0069121 A | 6/2019 |
| KR | 10-2020-0033778 A | 3/2020 |
| WO | 2020/110093 A1 | 6/2020 |
| WO | WO 2020-203101 A1 | 10/2020 |

OTHER PUBLICATIONS

Chinese Notification of First Office Action with English Translation, for Patent Application No. 202111663358.9, mailed Dec. 28, 2023, 18 pages.

* cited by examiner

BATTERY MODULE

CROSS-REFERENCE TO RELATED APPLICATION

The present application claims priority to and the benefit of Korean Patent Application No. 10-2020-0189843, filed on Dec. 31, 2020, and Korean Patent Application No. 12021-0192904, filed on Dec. 30, 2021 in the Korean Intellectual Property Office, the entire contents of both of which are incorporated herein by reference.

BACKGROUND

1. Field

Aspects of some embodiments of the present disclosure relate to a battery module.

2. Description of the Related Art

Generally, a secondary battery is a battery that may be recharged and discharged repeatedly, unlike a primary battery that is generally not rechargeable. A secondary battery may be used as an energy source for various electronic devices such as a mobile device, an electric vehicle, a hybrid vehicle, an electric bicycle, an uninterruptible power supply, etc. and may be used in the form of a single battery or as a package in which a plurality of batteries are grouped or packaged in a unit, according to a type of an external device to which the secondary battery is applied.

A small mobile device, such as a cellular phone, may operate for a set or predetermined period of time with the output and capacity of a single battery, but in the case of a mobile device having a relatively large size, such as a notebook computer, an electric vehicle consuming a relatively large amount of power, or a device requiring an operation of a relatively long duration and high power, such as a hybrid vehicle, a battery in the form of a package including a plurality of batteries may be utilized in order to enable sufficient output and capacity, and an output voltage or an output current may be increased based on the number of equipped batteries.

The above information disclosed in this Background section is only for enhancement of understanding of the background and therefore the information discussed in this Background section does not necessarily constitute prior art.

SUMMARY

Aspects of one or more embodiments include a battery module having a module housing that provides relatively good cooling performance and at the same time has a relatively reduced weight by applying a composite material including different kinds of materials.

Additional aspects will be set forth in part in the description which follows and, in part, will be apparent from the description, or may be learned by practice of the presented embodiments of the disclosure.

According to one or more embodiments, a battery module includes: one or more cell assemblies; a main housing including a main boundary portion surrounding an accommodation space in which the one or more cell assemblies are accommodated; a first plate including a first boundary portion coupled with the main boundary portion and a first exposure portion exposed from the main boundary portion and defining a side of a cooling fluid passage for cooling the accommodation space; and a second plate arranged to face the first plate and including a second boundary portion coupled with the main boundary portion and a second exposure portion exposed from the main boundary portion and defining the other side of the cooling fluid passage.

According to some embodiments, the accommodation space may include a plurality of accommodation spaces in which the one or more cell assemblies that are different from each other are accommodated, and the main boundary portion may surround each of the plurality of accommodation spaces.

According to some embodiments, the first plate may include a plurality of first plates separately provided for the plurality of accommodation spaces, respectively.

According to some embodiments, the second plate may include one second plate commonly provided for all of the plurality of accommodation spaces.

According to some embodiments, the main boundary portion may include: a main outer boundary portion including an outer wall structure of the main housing, the outer wall structure surrounding all of the accommodation spaces across the accommodation spaces adjacent to each other; and a main inner boundary portion including an inner wall structure of the main housing, the inner wall structure being arranged between the accommodation spaces adjacent to each other.

According to some embodiments, the first boundary portion may be provided along an edge of the first plate.

According to some embodiments, the main boundary portion and the first boundary portion may be coupled with each other by a first coupling line provided along the edge of the first plate.

According to some embodiments, the first coupling line may include a holding portion that is recessed to be concave so as to surround the first boundary portion.

According to some embodiments, the recessed holding portion may continually surround an upper surface, a lower surface, and a side surface of the first boundary portion, the side surface connecting the upper surface with the lower surface.

According to some embodiments, an upper surface of the first plate may include the upper surface of the first boundary portion and an upper surface of the first exposure portion facing the accommodation space, and a lower surface of the first plate may include the lower surface of the first boundary portion and a lower surface of the first exposure portion facing the cooling fluid passage.

According to some embodiments, the recessed holding portion may include an upper width covering the upper surface of the first boundary portion and a lower width covering the lower surface of the first boundary portion, and the lower width of the recessed holding portion may be greater than the upper width of the recessed holding portion.

According to some embodiments, a filling width may be provided on the first boundary portion to extend to deviate from the upper width to a boundary between the first boundary portion and the first exposure portion.

According to some embodiments, a filling member may be provided on the filling width to reinforce coupling between the first boundary portion and the main boundary portion.

According to some embodiments, the second boundary portion may include a second boundary portion provided along an edge of the second plate and a second boundary portion provided around a slit provided in the second plate.

According to some embodiments, the main boundary portion and the second boundary portion may be coupled with each other by a second coupling line provided along the edge of the second plate and a second coupling line provided around the slit in the second plate.

According to some embodiments, the second coupling line may include a sealing portion provided at least between the main boundary portion and the second boundary portion.

According to some embodiments, the sealing portion may include a first sealing portion extending between the main boundary portion and the second boundary portion and a second sealing portion extending from a location touching an outside of the main boundary portion across the first sealing portion in a direction crossing the first sealing portion.

According to some embodiments, the first sealing portion and the second sealing portion may cross each other in a middle location between an uppermost location and a lowermost location in the direction in which the second sealing portion extends.

According to some embodiments, an outer sealing portion for coupling between the main outer boundary portion of the main boundary portion and the second boundary portion may include the first sealing portion extending from a side of the second sealing portion and may provide an asymmetrical cross-section, and an inner sealing portion for coupling between the main inner boundary portion of the main boundary portion and the second boundary portion may include the first sealing portion extending from both sides of the second sealing portion and may provide a symmetrical cross-section.

According to some embodiments, the second boundary portion may include a flat plate portion coupled with the main boundary portion with the sealing portion between the flat plate portion and the main boundary portion, and a protrusion step portion provided between the flat plate portion and the second exposure portion.

According to some embodiments, the protrusion step portion may include an upper surface upwardly protruding and a lower surface that is concave and indented from below.

According to some embodiments, an upper surface of the protrusion step portion may be aligned with the main boundary portion by being inserted into a pair of bump portions, which protrude from both sides of the protrusion step portion in the main boundary portion such that the protrusion step portion is arranged between the pair of bump portions.

According to some embodiments, a lower surface of the protrusion step portion may provide a jig groove having a concave shape.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
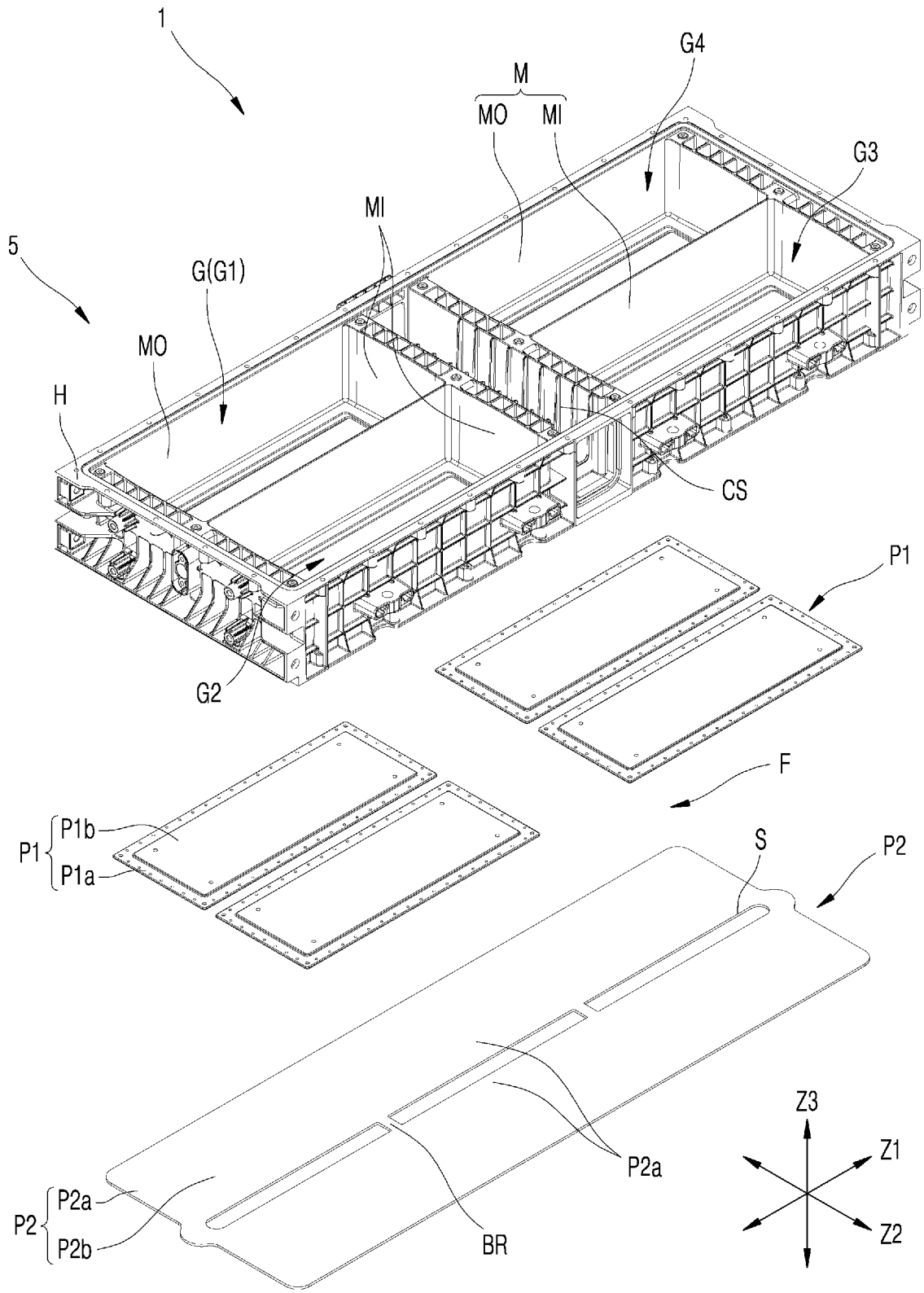
FIG. 1 is an exploded perspective view of a battery module according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a battery module according to some embodiments is described with reference to the accompanying drawings.

Figure 2:
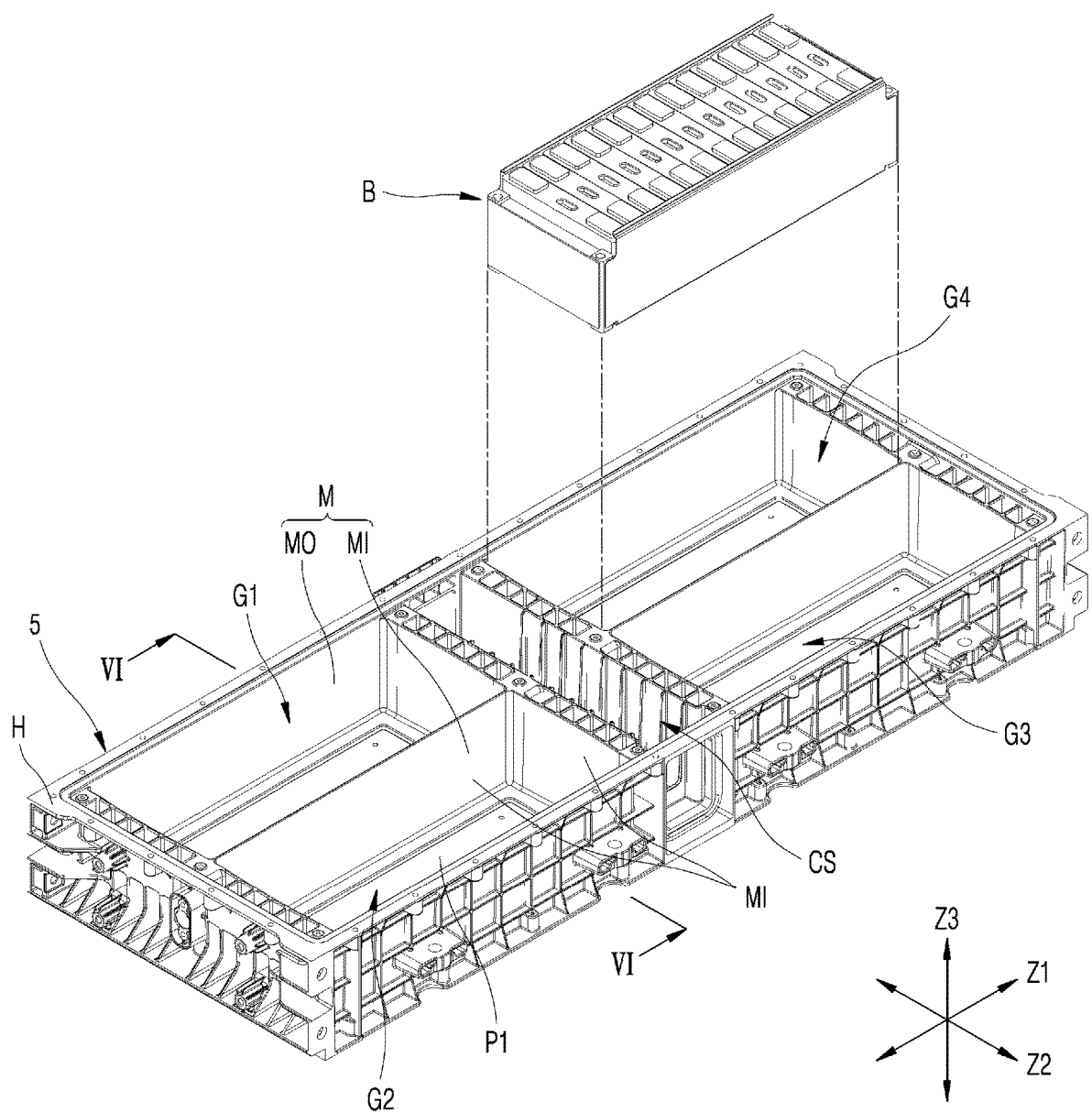
FIG. 2 is a perspective view of a module housing illustrated in FIG. 1.
Figure 3:
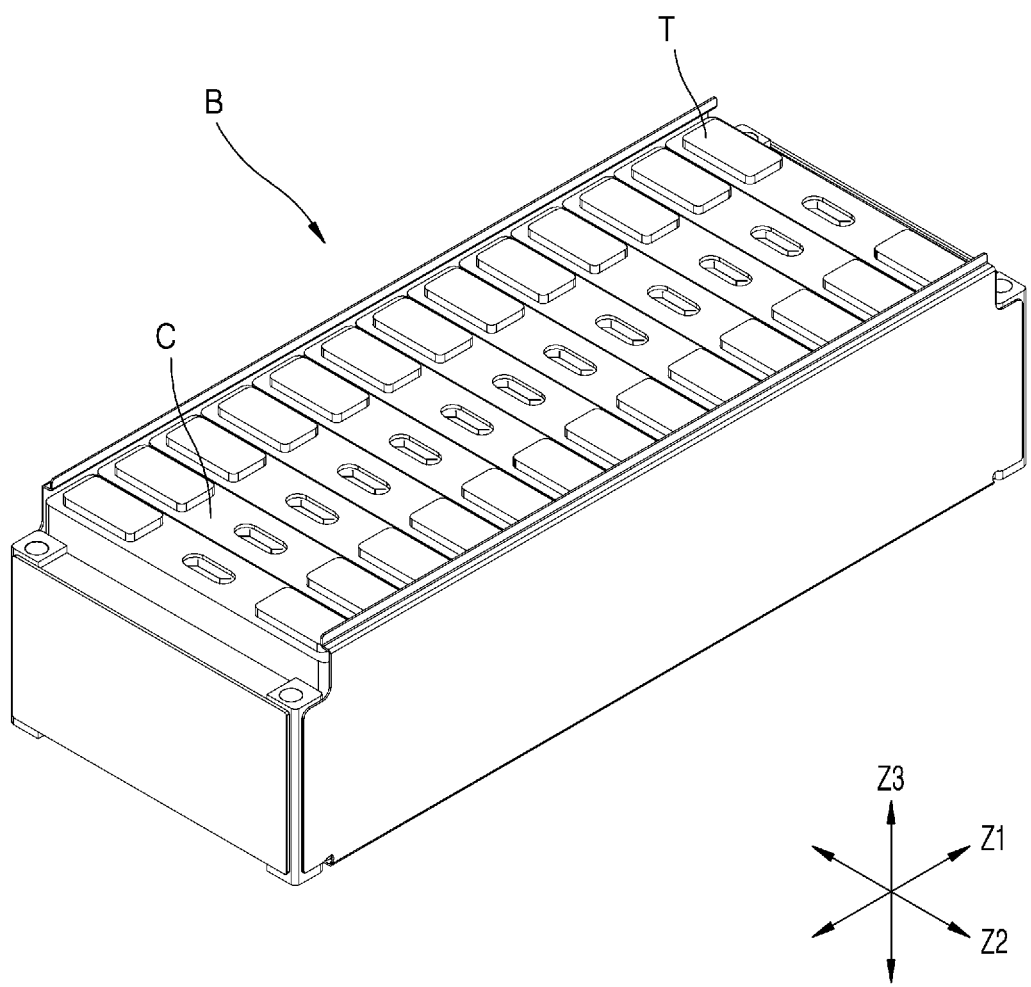
FIG. 3 is a perspective view of a cell assembly illustrated in FIG. 1.
Figure 4:
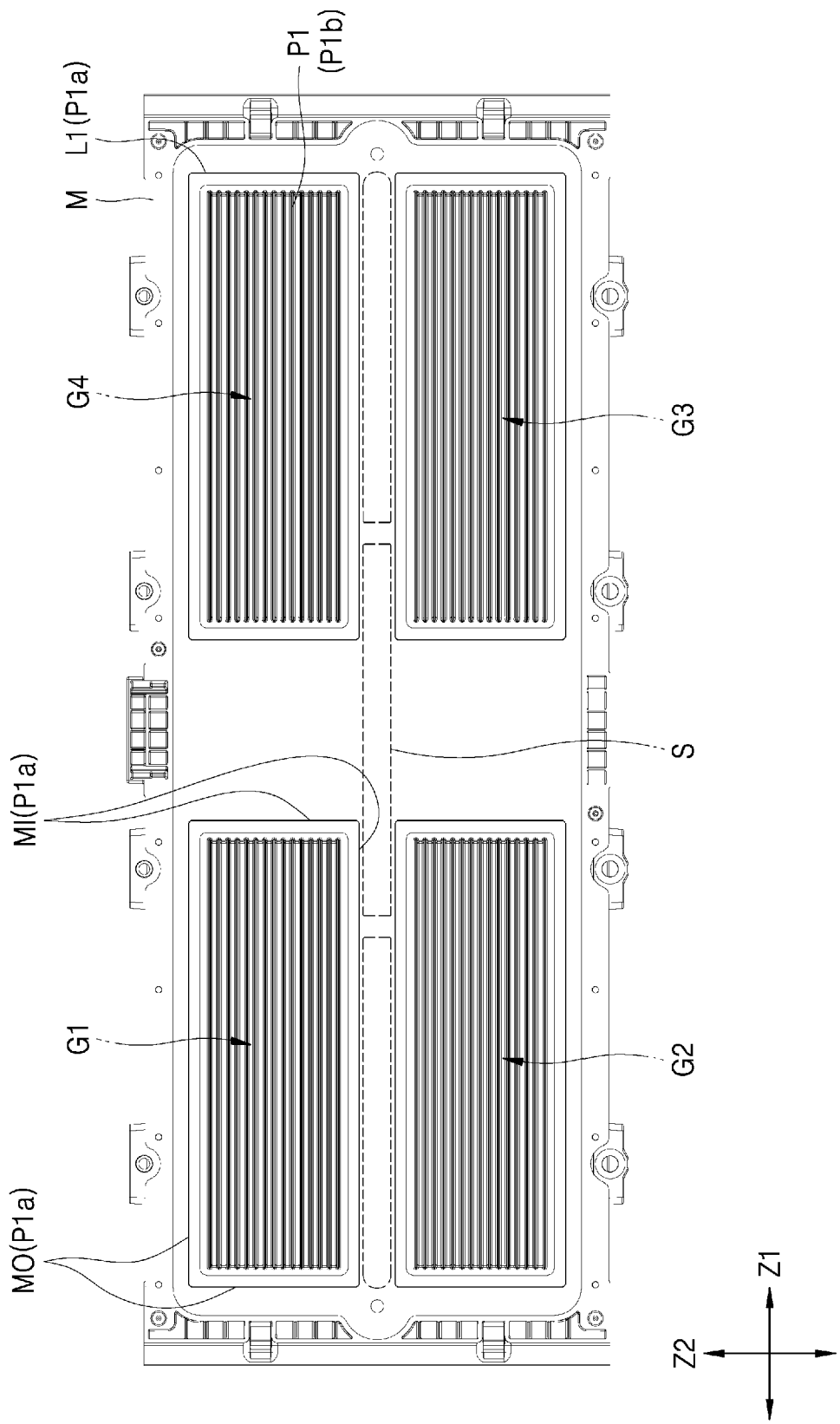
FIG. 4 is a view of a first coupling line for coupling a first plate illustrated in FIG. 1.
Figure 5:
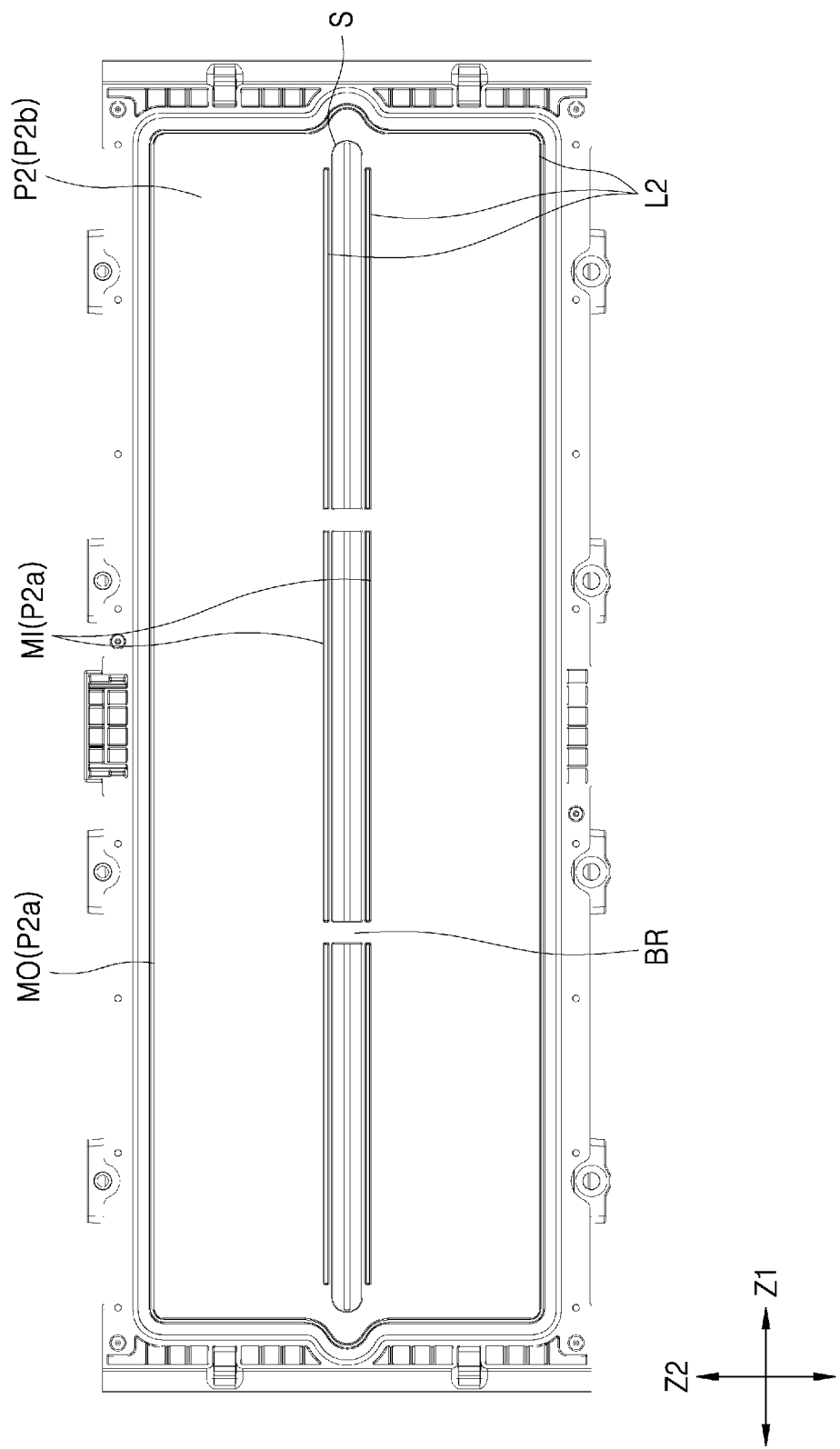
FIG. 5 is a view of a second coupling line for coupling a second plate illustrated in FIG. 1.
Figure 6:
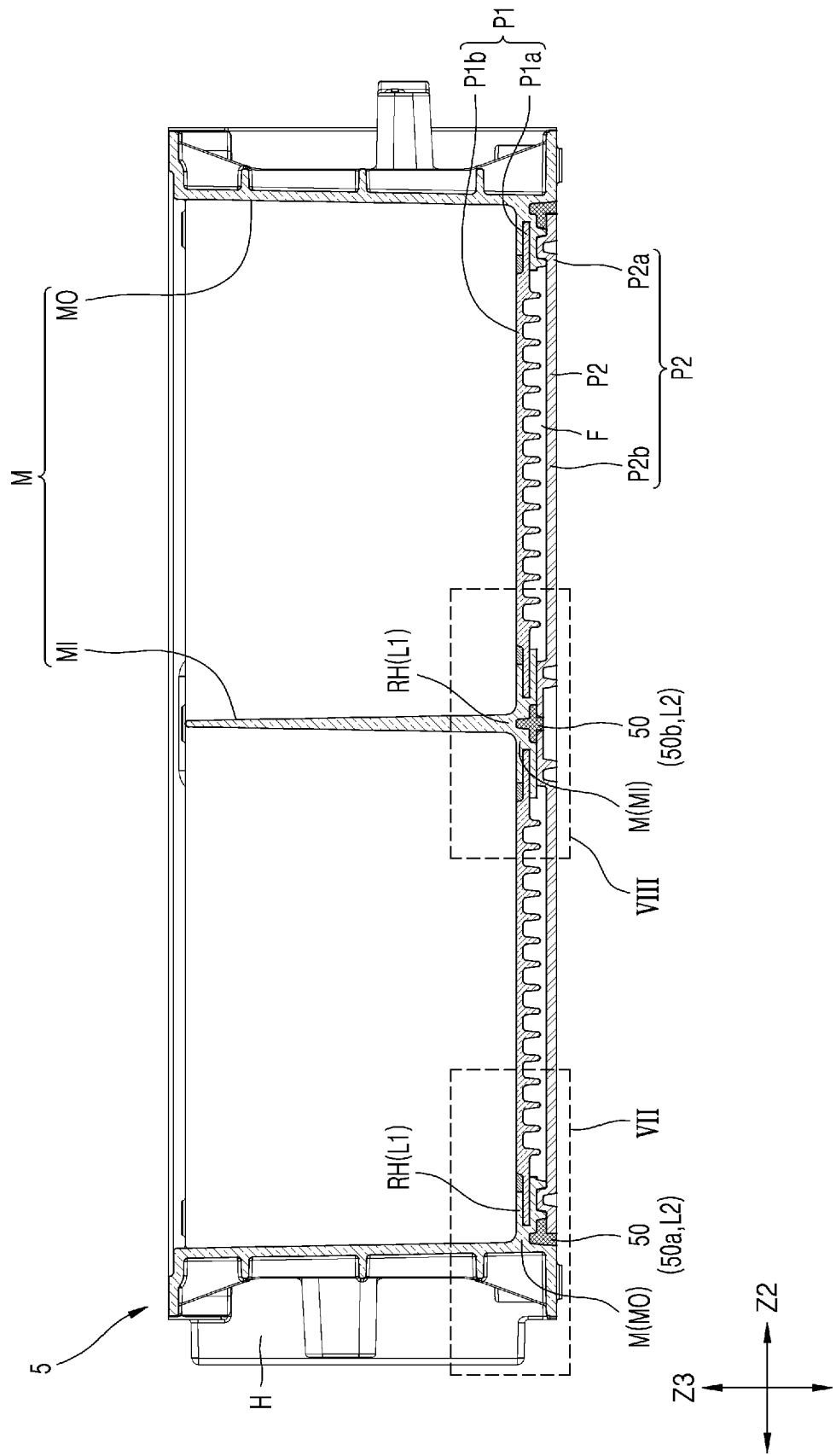
FIG. 6 is a cross-sectional view of the module housing of FIG. 2, taken along a line VI-VI.
Figure 7:
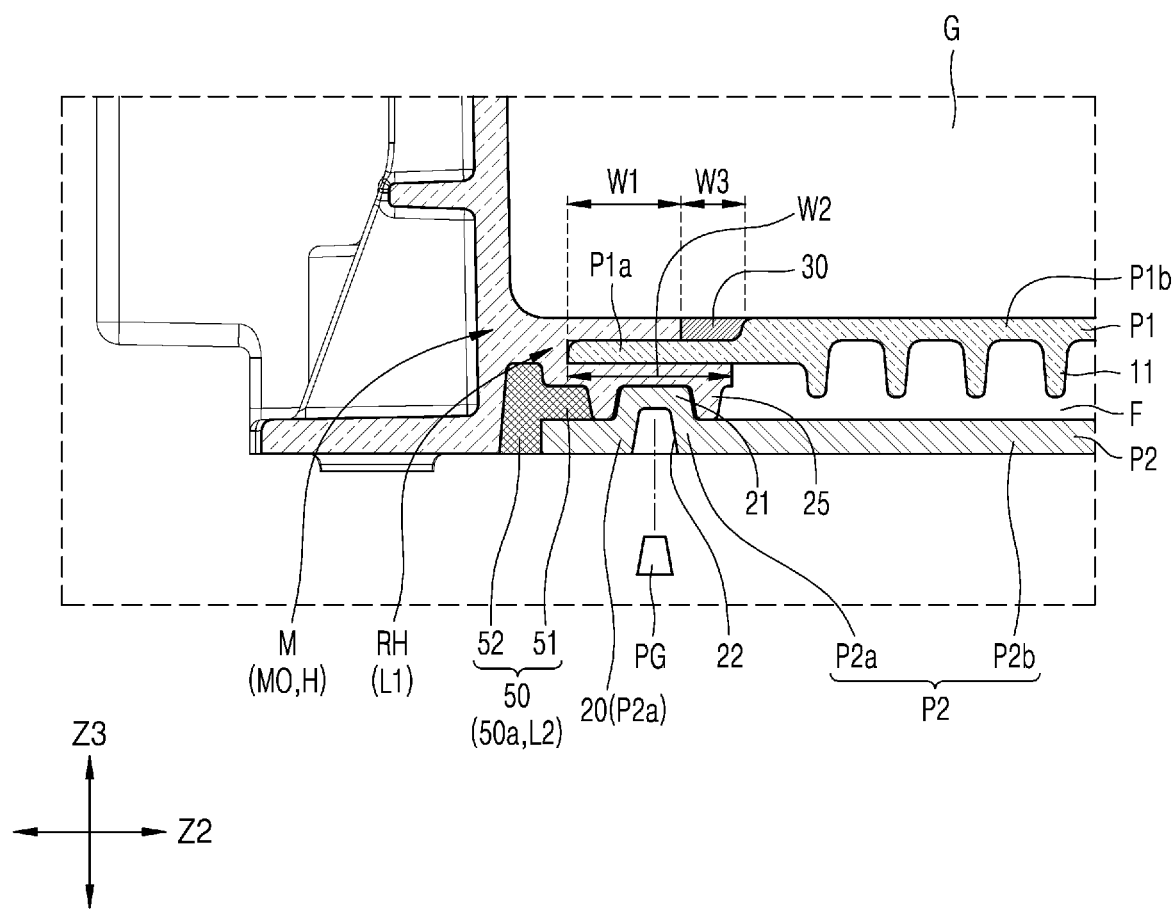
FIG. 7 is an enlarged cross-sectional view of a region VII of FIG. 6.
Figure 8:
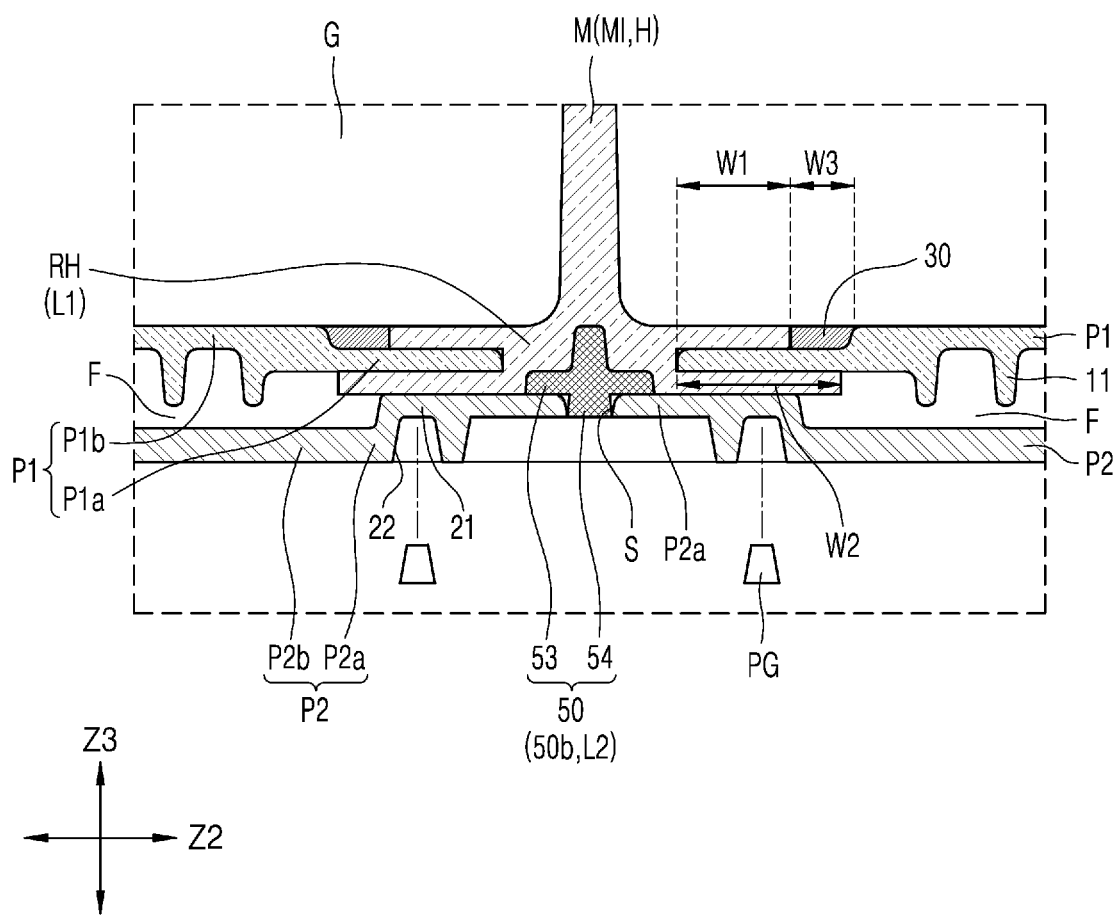
FIG. 8 is an enlarged cross-sectional view of a region VIII of FIG. 6.

FIG. 1 is an exploded perspective view of a battery module 1 according to some embodiments. FIG. 2 is a perspective view of a module housing 5 illustrated in FIG. 1. FIG. 3 is a perspective view of a cell assembly B illustrated in FIG. 1. FIG. 4 is a view of a first coupling line for coupling a first plate P1 illustrated in FIG. 1. FIG. 5 is a view of a second coupling line for coupling a second plate P2 illustrated in FIG. 1. FIG. 6 is a cross-sectional view of the module housing 5 of FIG. 2, taken along a line VI-VI. FIG. 7 is an enlarged cross-sectional view of a region VII of FIG. 6. FIG. 8 is an enlarged cross-sectional view of a region VIII of FIG. 6.

Referring to FIGS. 1 through 6, the battery module 1 may include one or more cell assemblies or cell stacks B and the module housing 5 in which the one or more cell assemblies B are accommodated. The module housing 5 may include: a main housing H including a main boundary portion M surrounding an accommodation space G in which the cell assembly B is accommodated; the first plate P1 including a first boundary portion P1a coupled to the main boundary portion M and a first exposure portion P1b exposed from the main boundary portion M and defining a side of a cooling fluid passage F for cooling the accommodation space G; and the second plate P2 arranged to face the first plate P1 and including a second boundary portion P2a coupled to the main boundary portion M and a second exposure portion P2b exposed from the main boundary portion M and defining the other side of the cooling fluid passage F.

The main housing H may form the accommodation space G of the cell assembly B. The main housing H may define a plurality of accommodation spaces G for accommodating the one or more cell assemblies B and may include the main boundary portion M surrounding each of the plurality of accommodation spaces G. According to some embodiments, the main housing H may include first through fourth accommodation spaces G1, G2, G3, and G4 accommodating different cell assemblies B, respectively, and the main boundary portion M may surround each of the first through fourth accommodation spaces G1, G2, G3, and G4.

According to some embodiments, the main boundary portion M may surround each of the different accommodation spaces G and may further define a circuit space CS for accommodating (e.g., positioning) a circuit portion (or circuit or one or more circuit components) between the accommodation spaces G which are adjacent to each other. For example, according to some embodiments, the circuit space CS may be formed between the first and fourth accommodation spaces G1 and G4 adjacent to each other in a first direction Z1 and between the second and third accommodation spaces G2 and G3 adjacent to each other in the first direction Z1. Throughout this specification, the first direction Z1 may correspond to a longitudinal direction of the cell assembly B or a longitudinal direction of the accommodation space G in which the cell assembly B is accommodated and to a direction in which a plurality of battery cells C are arranged, wherein the plurality of battery cells are included in the cell assembly B.

The main housing H may include the main boundary portion M surrounding the accommodation space G for accommodating the cell assembly B. According to some embodiments, the main boundary portion M may denote a wall structure of the main housing H, which is formed along a circumference of the cell assembly B. According to some embodiments, the main boundary portion M may denote a wall structure surrounding the accommodation space G having a rectangular shape so as to surround the cell assembly B having an approximately rectangular shape. Here, the wall structure forming the main boundary portion M may refer to a wall structure facing each side portion including a front surface, a rear surface, and a side surface of the cell assembly B, except for an upper surface and a lower surface of the cell assembly B.

Not only the wall structure may face each side portion of the cell assembly B, but also the wall structure may face portions of the lower surface of the cell assembly B, the portions being connected to each side portion. The wall structure may extend from its portion facing each side portion of the cell assembly B to face the lower surface (for example, the portions of the lower surface) of the cell assembly B. According to some embodiments, the side portion of the cell assembly B may denote a side portion connecting the upper surface and the lower surface of the cell assembly B, except for the upper surface from which an electrode terminal T (see FIG. 3) of the cell assembly B protrudes and the lower surface that is the opposite to the upper surface, and the main boundary portion M may surround each side portion of the cell assembly B and form the accommodation space G of the cell assembly B. As described above, the main boundary portion M may mainly face the side portions of the cell assembly B and may also extend to face the portions of the lower surface, the portions being connected to the side portions of the cell assembly B.

The main boundary portion M may include a main inner boundary portion MI formed between the accommodation spaces G which are adjacent to each other and a main outer boundary portion MO generally surrounding the adjacent accommodation spaces G across the adjacent accommodation spaces G. The main outer boundary portion MO may be formed along the exterior of the main housing H, and the main inner boundary portion MI may be formed in the interior of the main housing H.

The main inner boundary portion MI may be formed between the first and second accommodation spaces G1 and G2 adjacent to each other in a second direction Z2 (e.g., a direction perpendicular to the first direction Z1), between the third and fourth accommodation spaces G3 and G4 adjacent to each other in the second direction Z2, between the first and fourth accommodation spaces G1 and G4 adjacent to each other in the first direction Z1, and between the second and third accommodation spaces G2 and G3 adjacent to each other in the first direction Z1. Here, the first direction Z1 may correspond to a longitudinal direction of the cell assembly B or a longitudinal direction of the accommodation space G in which the cell assembly B is accommodated, and the second direction Z2 may be a direction crossing the first direction Z1 and may correspond to a width direction of the cell assembly B or a width direction of the accommodation space G in which the cell assembly B is accommodated.

The main inner boundary portion MI may be formed as a single wall structure between the first and second accommodation spaces G1 and G2 adjacent to each other in the second direction Z2 and between the third and fourth accommodation spaces G3 and G4 adjacent to each other in the second direction Z2. Also, the main inner boundary portion MI may be formed as a dual wall structure between the first and fourth accommodation spaces G1 and G4 adjacent to each other in the first direction Z1 and between the second and third accommodation spaces G2 and G3 adjacent to each other in the first direction Z1. According to some embodiments, the dual wall structure between the first and fourth accommodation spaces G1 and G4 may be arranged with the circuit space CS therebetween. Likewise, the dual wall structure between the second and third accommodation spaces G2 and G3 may be arranged with the circuit space CS therebetween.

For example, the circuit space CS may be connected as a single space between the first and fourth accommodation spaces G1 and G4 and between the second and third accommodation spaces G2 and G3. According to some embodiments, a circuit portion electrically connected to the plurality of cell assemblies B may be arranged in the circuit space CS. According to some embodiments, the circuit portion electrically connected to the plurality of cell assemblies B, for example, a bus bar, etc. for electrically connecting the plurality of cell assemblies B with each other may be arranged in the circuit space CS. According to some embodiments, the main inner boundary portion MI may denote an inner wall structure of the main housing H, which is arranged between the spaces defined by the main housing H. That is, the main inner boundary portion MI may denote an inner wall structure of the main housing H, which is arranged between the first through fourth accommodation spaces G1 through G4 adjacent to each other and the circuit space CS. Throughout this specification, with respect to the main inner boundary portion MI, a single wall of the dual wall structure formed between the first and fourth accommodation spaces G1 and G4 adjacent to each other in the first direction Z1 and between the second and third accommodation spaces G2 and G3 adjacent to each other in the first direction Z1 may be referred to as the main inner boundary portion MI, or the dual wall structure may be collectively referred to as the main inner boundary portion MI.

The main outer boundary portion MO may denote an outer wall structure forming the main housing H and may denote a wall structure generally surrounding the first through fourth accommodation spaces G1 through G4 and the circuit space CS defined by the main housing H. According to some embodiments, the main outer boundary portion MO may correspond to an outer wall structure extending across the adjacent first through fourth accommodation spaces G1 through G4 and generally surrounding the first through fourth accommodation spaces G1 through G4.

According to some embodiments, each of the first through fourth accommodation spaces G1 through G4 may be surrounded by the combination of the main outer boundary portion MO and the main inner boundary portion MI. For example, by a contact between the main outer boundary portion MO having a bent shape and the main inner boundary portion MI having a bent shape, the main outer boundary portion MO and the main inner boundary portion MI being formed in locations to face each other in a diagonal direction across each accommodation space G, each of the first through fourth accommodation spaces G1 through G4 may be defined. The first plate P1 separately formed for each of the first through fourth accommodation spaces G1 through G4 may form a coupling line with each of the bent-shaped main outer boundary portion MO and the bent-shaped main inner boundary portion MI that are formed in locations to face each other in the diagonal direction across each accommodation space G. For example, the first plate P1 formed in the first accommodation space G may form the coupling line with the bent-shaped main outer boundary portion MO and the bent-shaped main inner boundary portion MI that are formed in locations to face each other in the diagonal direction across the first accommodation space G. Here, as described below, the first plate P1 may form a first coupling line L1 with each of the main outer boundary portion MO and the main inner boundary portion MI through a recessed holding portion RH.

Throughout this specification, the first coupling line L1 may denote a coupling line for fixing the location of the first plate P1 through the recessed holding portion RH (see FIGS. 7 and 8). Here, the recessed holding portion RH may fix the location of the first plate P1 by continually surrounding an upper surface, a lower surface, and a side surface of the first boundary portion P1a formed along an edge of the first plate P1. Technical aspects regarding the recessed holding portion RH will be described in more detail below.

According to some embodiments, a second plate P2 commonly formed for all of the accommodation spaces G may form a second coupling line L2 with the main outer boundary portion MO. For example, the second plate P2 may form a second coupling line L2 through a sealing portion 50 (see FIGS. 7 and 8) arranged between the second plate P2 and the main outer boundary portion MO. Throughout this specification, the second coupling line L2 may denote a coupling line for fixing the location of the second plate P2 through the sealing portion 50. The sealing portion 50 may be arranged between the second boundary portion P2a formed along an edge of the second plate P2 and the main outer boundary portion MO and may mediate the coupling between the second plate P2 and the main outer boundary portion MO. Technical aspects regarding the sealing portion 50 will be described in more detail below.

Throughout this specification, the edge of the second plate P2 may be a portion formed along the exterior of the second plate P2, and a portion around a slit S formed in the second plate P2 may not belong to the edge of the second plate P2. As described in more detail below, the second boundary portion P2a formed in the second plate P2 may include a second boundary portion P2a formed along the edge of the second plate P2 and a second boundary portion P2a formed along the portion around the slit S formed in the interior of the second plate P2. However, the portion around the slit S formed in the interior of the second plate P2 may not belong to the edge of the second plate P2.

According to some embodiments, the second plate P2 may form the second coupling line L2 with the main outer boundary portion MO and may also form the second coupling line L2 with the main inner boundary portion MI. The second plate P2 may be commonly formed with respect to all of the accommodation spaces G and may form a common base for all of the accommodation spaces G. The second plate P2 may form the second coupling line L2 with the main outer boundary portion MO. According to some embodiments, to increase the power of fixing the location of the second plate P2, the slit S may be formed in the second plate P2, and the second coupling line L2 may also be formed along the second boundary portion P2a around the slit S. That is, the second coupling line L2 may include a second coupling line L2 forming the coupling with the main outer boundary portion MO along the edge of the second plate P2 and a second coupling line L2 forming the coupling with the main inner boundary portion MI along the portion around the slit S of the second plate P2. According to some embodiments, the slit S may be formed in (e.g., extend along) the first direction Z1 and may be formed to be long along the main inner boundary portion MI so as to form the second coupling line L2 with the main inner boundary portion MI.

The slit S may extend in the first direction Z1 along the main inner boundary portion MI and may extend between the adjacent first and second accommodation spaces G1 and G2 and the adjacent third and fourth accommodation spaces G3 and G4. According to some embodiments, the slit S may include a plurality of slits S apart from each other along the first direction Z1. According to some embodiments, the slit S may include three slits (or sub-slits) S apart from each other, although embodiments according to the present disclosure is not limited thereto, and the slit S may include any suitable number of slits according to the design of the battery module 1. Here, a bridge BR (see FIG. 1) may be formed between (e.g., as a separation between) the slits S adjacent to each other along the first direction Z1.

The second plate P2 may be formed in a large area throughout the entire module housing 5 to cover all of the first through fourth accommodation spaces G1 through G4, and accordingly, through the bridge BR formed between the adjacent slits S, the rigidity of the second plate P2 may be maintained. Also, the bridge BR may be formed between the adjacent slits S to prevent or reduce bending of the second plate P2 due to external shocks applied to the second plate P2 in the second direction Z2 crossing the first direction Z1. Accordingly, the slit S extending in the first direction Z1 may be disconnected at the bridge BR and may include the plurality of slits (or sub-slits) S that are spaced apart from each other in the first direction Z1.

According to some embodiments, the first plate P1 may form the bottom of the accommodation space G in which the cell assembly B is accommodated and may form the cooling fluid passage F for cooling the lower surface of the cell assembly B, which faces the bottom of the accommodation space G. The first plate P1 may be separately formed for each accommodation space G and may not be formed in the circuit space CS, except the accommodation space G accommodating the cell assembly B. Thus, with respect to the circuit space CS, the first plate P1 may not form the bottom of the circuit space CS, and the main housing H surrounding the first plate P1 may form the bottom of the circuit space CS. For example, according to some embodiments, the first plate P1 may form the bottom of each of the first through fourth accommodation spaces G1 through G4 by closing an opening formed in the main housing H, the opening corresponding to each of the first through fourth accommodation spaces G1 through G4, and the bottom of the circuit space CS may be formed by the main housing H between the openings corresponding to the first through fourth accommodation spaces G1 through G4, respectively.

The second coupling line L2 may be formed along the second boundary portion P2a formed at the edge of the second plate P2 and the second boundary portion P2a formed around the slit S. The second boundary portion P2a formed at the edge of the second plate P2 may form the second coupling line L2 with the main outer boundary portion MO, and the second boundary portion P2a formed around the slit S may form the second coupling line L2 with the main inner boundary portion MI, and thus, the power of fixing the location of the second plate P2 may be relatively increased through the second coupling lines L2 formed in the inner portion and the outer portion of the second plate P2.

Here, the second coupling line L2 may form the coupling with the second boundary portion P2a formed at the edge of the second plate P2 and may form the coupling with the second boundary portion P2a formed around the slit S. Here, the second coupling line L2 formed along the edge of the second plate P2 may be formed to have a shape of a closed loop, surrounding the edge of the second plate P2, and the second coupling line L2 formed around the slit S may be formed to have a stripe shape along the slit S extending to be long along the main inner boundary portion MI. As described above, the second coupling line L2 may be formed along the edge of the second plate P2 and may be formed around the slit S of the second plate P2. Here, the second coupling line L2 formed along the edge of the second plate P2 and the second coupling line L2 formed around the slit S of the second plate P2 may have different cross-sectional structures from each other.

For example, on a cross-sectional view taken in the second direction Z2, the second coupling line L2 (or the sealing portion 50 forming the second coupling line L2, see FIG. 7) formed at the edge of the second plate P2 may have a different cross-sectional structure from the second coupling line L2 (or the sealing portion 50 forming the second coupling line L2, see FIG. 8) formed around the slit S of the second plate P2. This may be because, while the second coupling line L2 (or the sealing portion 50, see FIG. 7) formed along the edge of the second plate P2 may form the coupling with one second boundary portion P2a formed at the edge of the second plate P2, the second coupling line L2 (or the sealing portion 50, see FIG. 8) formed around the slit S of the second plate P2 may form the coupling with two second boundary portions P2a formed at both sides of the slit S. For example, the second coupling line L2 (or the sealing portion 50) formed along the edge of the second plate P2 may form the coupling with one second boundary portion P2a formed at the edge of the second plate P2 and may have an asymmetrical cross-sectional structure, and the second coupling line L2 (or the sealing portion 50) formed around the slit S of the second plate P2 may form the coupling with two second boundary portions P2a formed at both sides of the slit S and may have a symmetrical cross-sectional structure. The cross-sectional structure of the second coupling line L2 (or the sealing portion 50) will be described in more detail below. For reference, throughout this specification, as illustrated in FIG. 5, with respect to the second boundary portions P2a formed at both sides of the slit S, each of the second boundary portions P2a formed at a side or the other side of the slit S may be referred to as the second boundary portion P2a, or a pair of second boundary portions P2a formed at both sides of the slit S may be collectively referred to as the second boundary portion P2a.

The main housing H may include the main boundary portion M surrounding each of the different accommodation spaces G and an opening surrounded by the main boundary portion M. For example, the opening may be formed for each accommodation space G. The opening may be formed at the bottom of the accommodation space G corresponding to the lower surface of the cell assembly B, and the main boundary portion M may be formed to surround the opening formed in each accommodation space G. Here, the lower surface of the cell assembly B may mainly face the opening and may also face a portion of the main boundary portion M surrounding the opening.

The opening of the main housing H may be closed by the first plate P1. For example, the first plate P1 may include a plurality of first plates P1 arranged in the first through fourth accommodation spaces G1 through G4, respectively. That is, the opening formed in each of the first through fourth accommodation spaces G1 through G4 may be closed by each of the plurality of first plates P1 separately formed for each of the first through fourth accommodation spaces G1 through G4. Also, while each of the plurality of first plates P1 may form the bottom of the accommodation space G, the first plate P1 may provide a supporting base of the cell assembly B accommodated in each of the first through fourth accommodation spaces G1 through G4. The first plate P1 may be coupled with the main boundary portion M surrounding the opening and may form the first coupling line L1 to close the opening.

According to some embodiments, the first plate P1 may be coupled with the main boundary portion M through the first coupling line L1. For example, an upper surface, a lower surface, and a side surface of the first boundary portion P1a formed at the edge of the first plate P1 may be continually surrounded by the recessed holding portion RH (see FIGS. 7 and 8) of the main boundary portion M, and the location of the first plate P1 may be fixed. According to some embodiments, the first boundary portion P1a formed at the edge of the first plate P1 may be buried in the main boundary portion M and may form the first coupling line L1 with the main boundary portion M. For example, the first boundary portion P1a of the first plate P1 may be buried in the main boundary portion M and may not be exposed from the main boundary portion M. That is, at least the upper surface and the lower surface of the first boundary portion P1a may be covered by the main boundary portion M and may not be exposed from the main boundary portion M. According to some embodiments, the upper surface, the lower surface, and the side surface of the first boundary portion P1a, the side surface connecting the upper surface with the lower surface of the first boundary portion P1a, may be surrounded by the main boundary portion M, and the main boundary portion M may include the recessed holding portion RH continually surrounding the upper surface, the lower surface, and the side surface of the first boundary portion P1a and having a concave shape for accommodating the first boundary portion P1a.

The first plate P1 may include the first boundary portion P1a coupled to the main boundary portion M and the first exposure portion P1b exposed from the main boundary portion M. Here, the first exposure portion P1b may be exposed from the main boundary portion M and may be exposed to the accommodation space G surrounded by the main boundary portion M. As described below, the first exposure portion P1b may be exposed through the accommodation space G and may form the cooling fluid passage F for cooling the cell assembly B accommodated in the accommodation space G. That is, the first boundary portion P1a of the first plate P1 may form the coupling with the main boundary portion M, and the first exposure portion P1b of the first plate P1 may extend to deviate from the main boundary portion M and may form the cooling fluid passage F of the accommodation space G (the cell assembly B accommodated in the accommodation space G) surrounded by the main boundary portion M. As described below, the cooling fluid passage F may be formed between the first plate P1 forming the bottom of the accommodation space G and the second plate P2 arranged to face the first plate P1, and the first plate P1 may mediate a heat transfer between the lower surface of the cell assembly B and the cooling fluid passage F and may refrigerate the cell assembly B. According to some embodiments, the first plate P1 may include a metal material having excellent heat conductivity, for example, aluminum, to facilitate a heat transfer between the cell assembly B and the cooling fluid passage F. According to some embodiments, the first plate P1 may include a metal material that is different from a resin material forming the main housing, and the first plate P1 may be integrally formed with the main housing H via insert molding. Here, the first plate P1 may be separately formed for each of the plurality of accommodation spaces G. The first plate P1 may be separately formed for each of the adjacent accommodation spaces G, and thus, thermal interference or electrical interference between different cell assemblies B accommodated in the adjacent accommodation spaces G may be prevented or reduced. As described above, the first plate P1 separately formed for each of the plurality of accommodation spaces G may form the supporting base of the cell assembly B accommodated in each accommodation space G, and the location of the first plate P1 may be firmly fixed by the first coupling line L1 surrounding each accommodation space G. For example, the first coupling line L1 may be formed to have a shape of a closed loop surrounding each accommodation space G.

The second plate P2 may be arranged to face the first plate P1, and the cooling fluid passage F may be formed between the second plate P2 and the first plate P1. For example, the first and second plates P1 and P2 may be arranged to face each other in a third direction Z3. Here, the third direction Z3 may denote a direction crossing the first and second directions (the Z1 and Z2 directions). For example, the third direction Z3 may correspond to a height direction of the accommodation space G, which crosses the first direction Z1 corresponding to a longitudinal direction of the accommodation space G and the second direction Z2 corresponding to a width direction of the accommodation space G. For example, the third direction Z3 may correspond to a height direction of the cell assembly B, in which an upper surface and a lower surface of the cell assembly B face each other.

The second plate P2 may be arranged below the first plate P1, and like the first plate P1, the location of the second plate P2 may be fixed via the coupling with the main boundary portion M. In more detail, the second plate P2 may include the second boundary portion P2a coupled to the main boundary portion M and the second exposure portion P2b exposed from the main boundary portion M. According to some embodiments, the second plate P2 may include the second boundary portion P2a formed along the edge of the second plate P2 and the second boundary portion P2a formed around the slit S of the second plate P2, and the two second boundary portions P2a may be coupled with the main boundary portion M with the sealing portion 50 (see FIGS. 7 and 8) between the second boundary portions P2a and the main boundary portion M and may form the second coupling line L2.

The second plate P2 may be commonly formed for all of the accommodation spaces G and may extend across the plurality of accommodation spaces G. Here, the second plate P2 may form the coupling with the main outer boundary portion MO through the second boundary portion P2a formed at the edge of the second plate P2 and may form the coupling with the main inner boundary portion MI through the second boundary portion P2a formed around the slit S. That is, the second boundary portion P2a of the second plate P2 may form the second coupling line L2 with each of the main outer boundary portion MO and the main inner boundary portion MI. As described above, the second boundary portion P2a may form the coupling with the main boundary portion M through the second coupling line L2.

Also, with respect to a cross-sectional structure of the second coupling line L2, the second coupling line L2 (see, e.g., FIG. 7) formed along the edge of the second plate P2 and the second coupling line L2 (see, e.g., FIG. 8) formed around the slit S of the second plate P2 may have different cross-sectional structures from each other. This may be because, while the second coupling line L2 (see, e.g., FIG. 7) formed along the edge of the second plate P2 may form the coupling with one second boundary portion P2a formed at the edge of the second plate P2, the second coupling line L2 (see, e.g., FIG. 8) formed around the slit S of the second plate P2 may form the coupling with two second boundary portions P2a formed at both sides of the slit S, based on the slit S of the second plate P2. For example, the second coupling line L2 (see, e.g., FIG. 7) formed along the edge of the second plate P2 may have an asymmetrical cross-sectional structure, and the second coupling line L2 (see, e.g., FIG. 8) formed around the slit S of the second plate P2 may have a symmetrical cross-sectional structure. Here, the cross-sectional structure may correspond to a cross-sectional structure across the second coupling line L2 in the second direction Z2 corresponding to the width direction of the accommodation space G.

The second plate P2 may form the cooling fluid passage F with the first plate P1. For example, the first and second plates P1 and P2 may be apart from each other in the third direction Z3 corresponding to the height direction of the accommodation space G and may form the cooling fluid passage F having a size corresponding to a distance by which the first and second plates P1 and P2 are apart from each other in the third direction Z3. The first plate P1 may mediate the heat transfer between the cell assembly B and the cooling fluid passage F by contacting the lower surface of the cell assembly B, and thus, may include a metal material having excellent heat conductivity. However, the second plate P2 may have at least an insulating property rather than a heat conduction property, in order to block a heat transfer between the cooling fluid passage F and the ground and prevent or reduce the transfer of cold air of the cooling fluid passage F to the ground.

According to some embodiments, the second plate P2 may include a resin material and may include same kind of resin material with the main housing H, in consideration of a coupling force between the second plate P2 and the main housing H. As described below, the second coupling line L2 mediating the coupling between the second plate P2 and the main housing H may be formed by the sealing portion 50 (see FIGS. 7 and 8) arranged between the second plate P2 and the main housing H, and the sealing portion 50 may include same kind of resin material with the second plate P2 and the main housing H, which are to be coupled to each other by the sealing portion 50.

Accordingly, the main housing H and the second plate P2 including the same kind of resin material with each other may be firmly coupled to each other by using the sealing portion 50 arranged therebetween and including the same kind of resin material therewith. However, the technical scope of embodiments according to the present disclosure is not limited thereto. For example, the main housing H and the second plate P2 may include a flame retarding material, and the sealing portion 50 may not include a flame retarding material. Unlike the main housing H and the second plate P2, the sealing portion 50 may have a relatively small volume, and thus, even when the sealing portion 50 does not include a flame retarding material, problems may not be caused in an emergency situation, such as ignition, explosion, etc. Also, as described below, the sealing portion 50 may be formed in a location directly contacting the outside to require an additional sealing property, and thus, may include a material different from materials of the main housing H or the second plate P2.

The module housing 5 according to some embodiments may be formed via die sliding injection (DSI). For example, the main housing H and the first plate P1 including different kind of materials from each other may be integrally formed with each other via primary molding adopting insert molding, and then, the sealing portion 50 for coupling a primary molding structure, in which the main housing H and the first plate P1 are integrally formed with each other, with the second plate P2 may be formed via secondary molding.

For example, according to some embodiments, through the primary molding, while the primary molding structure, in which the main housing H and the first plate P1 including different kind of materials from each other are integrally formed with each other, is formed, the second plate P2 may be simultaneously or concurrently formed. Here, that the primary molding structure, in which the main housing H and the first plate P1 are integrally formed with each other, and the second plate P2 may be simultaneously or concurrently formed may denote that even when the first molding structure and the second plate P2 are formed through different molding jigs, the molding process may be simultaneously or concurrently performed at the different molding jigs that are arranged to be adjacent to each other. Also, in the secondary molding performed after the primary molding, the molding jigs adjacent to each other may be slid or adjusted to approach each other so that the primary molding structure and the second plate P2 may move to contact each other, and then, a sealing member or material may be injected between the primary molding structure and the second plate P2 (i.e., the DSI method). Thus, the module housing 5 may be formed. That is, the second plate P2 may be formed via the primary molding, and, in the secondary molding performed following the primary molding, the second plate P2 formed via the primary molding may be slid to touch the first molding structure in which the main housing H and the first plate P1 are integrally formed with each other, and then, the sealing member may be injected between the second plate P2 and the primary molding structure. Thus, the module housing 5 may be manufactured.

Here, in the secondary molding through which the sealing member is injected, the second plate P2 may have to firmly maintain a right position to touch the primary molding structure while being stably supported on the molding jig, and when the second plate P2 deviates from the right position, a coupling location between the second plate P2 and the primary molding structure may be misaligned with respect to each other, and a leakage of the cooling fluid passage F formed by the second plate P2 may occur. As described below, according to some embodiments, in order that the coupling location of the second plate P2 is stably maintained, a jig groove 22 (see FIGS. 7 and 8) may be formed in the second plate P2, and a pressing portion PG of the molding jig may be inserted into the jig groove 22 of the second plate P2. Accordingly, the coupling location of the second plate P2 may be firmly fixed, and the alignment location between the second plate P2 and the primary molding structure may be correctly maintained. Technical aspects regarding the jig groove 22 will be described in more detail below.

Hereinafter, referring to FIGS. 7 and 8, a cross-sectional structure of the first coupling line L1 forming the coupling between the main housing H and the first plate P1 and a cross-sectional structure of the second coupling line L2 forming the coupling between the main housing H and the second plate P2 are described. According to some embodiments, the cross-sectional structures of the first and second coupling lines L1 and L2 may correspond to cross-sectional structures of the first and second coupling lines L1 and L2 in the second direction Z2 corresponding to the width direction of the accommodation space G.

The first and second coupling lines L1 and L2 may include the first and second coupling lines L1 and L2 forming the coupling with the main outer boundary portion MO and the first and second coupling lines L1 and L2 forming the coupling with the main inner boundary portion MI. Hereinafter, first, the cross-sectional structures of the first and second coupling lines L1 and L2 forming the coupling with the main outer boundary portion MO is described, and then, the cross-sectional structures of the first and second coupling lines L1 and L2 forming the coupling with the main inner boundary portion MI is described.

For reference, hereinafter, the main boundary portion M is described by being divided into the main outer boundary portion MO and the main inner boundary portion MI. However, unless there is an additional explanation, technical aspects regarding the main outer boundary portion MO may be likewise applied to the main inner boundary portion MI, and reversely, technical aspects regarding the main inner boundary portion MI may be likewise applied to the main outer boundary portion MO.

Referring to FIG. 7, the first coupling line L1 may include the coupling between the main outer boundary portion MO and the first boundary portion P1a of the first plate P1. In more detail, the main outer boundary portion MO may include the recessed holding portion RH forming the coupling with the first boundary portion P1a of the first plate P1. The recessed holding portion RH may be formed to be concave to continually cover an upper surface, a lower surface, and a side surface of the first boundary portion P1a and may bury the first boundary portion P1a. Like this, the recessed holding portion RH may continually cover the upper surface, the lower surface, and the side surface of the first boundary portion P1a and may firmly fix a location of the first boundary portion P1a. The recessed holding portion RH may be formed by insert molding or primary molding through which the first plate P1 and the main housing H are integrally formed with each other.

The first plate P1 may form the cooling fluid passage F together with the second plate P2, and when coupling power between the first plate P1 and the main housing H decreases or there is a gap between the first plate P1 and the main housing H, a cooling medium of a high pressure flowing through the cooling fluid passage F may be leaked. Thus, according to some embodiments of the present disclosure, through the recessed holding portion RH formed to be concave to continually cover the first plate P1, that is, the upper surface, the lower surface, and the side surface of the first boundary portion P1a, a contact area between the main outer boundary portion MO and the first boundary portion P1a may be increased, and a coupling force of the first boundary portion P1a may be increased.

The upper surface of the first boundary portion P1a, covered by the recessed holding portion RH, may form an upper surface of the first plate P1, together with an upper surface of the first exposure portion P1b, facing the accommodation space G. Also, the lower surface of the first boundary portion P1a, covered by the recessed holding portion RH, may form a lower surface of the first plate P1 together with a lower surface of the first exposure portion P1b, facing the cooling fluid passage F.

The recessed holding portion RH may include an upper width W1 covering the upper surface of the first boundary portion P1a and a lower width W2 covering the lower surface of the first boundary portion P1a. According to some embodiments, the lower width W2 may be greater than the upper width W1. That is, the lower width W2 may be relatively greater than the upper width W1 in the second direction Z2. Here, a filling width W3 may be formed on the first boundary portion P1a to deviate from the upper width W1 that is relatively small. According to some embodiments, the filling width W3 may be formed on the first boundary portion P1a to deviate from the upper width W1 to a boundary with the first exposure portion P1b. A filling member 30 may be formed in the filling width W3, and the filling member 30 formed in the filling width W3 may enhance the coupling intensity between the main outer boundary portion MO and the first boundary portion P1a. That is, the filling member 30 may help strongly maintain the coupling between the main housing H and the first plate P1 by enhancing the coupling intensity between the main housing H including the main outer boundary portion MO and the first plate P1 including the first boundary portion P1a. Here, step differences may be formed at both ends of the filling width W3 in a thickness direction of the first plate P1 (the third direction Z3), and thus, concave filling spaces filled with the filling member 30 may be formed. The filling space may be defined at an end of the filling width W3 by the step difference between the main outer boundary portion MO forming the upper width W and the first boundary portion P1a, and the filling space may be defined at the other end of the filling width W3 by the step difference between the first boundary portion P1a and the first exposure portion P1b.

According to some embodiments, the first boundary portion P1a and the first exposure portion P1b included in the first plate P1 may be connected to have a step difference in the thickness direction (the third direction Z3) of the first plate P1. In more detail, the first exposure portion P1b may include an upper surface having an upward step difference from the first boundary portion P1a, and thus, may be formed to be thicker than the first boundary portion P1a. As described above, the step difference between the first exposure portion P1b and the first boundary portion P1a included in the first plate P1 may define the filling space in which the filling member 30 is filled.

The first plate P1 may close the opening surrounded by the main boundary portion M and may form the bottom of the accommodation space G facing the lower surface of the cell assembly B, together with the main boundary portion M. Also, the first exposure portion P1b of the first plate P1 exposed to the accommodation space G may form the cooling fluid passage F for cooling the lower surface of the cell assembly B. That is, the first exposure portion P1b may include an upper surface exposed to the accommodation space G in which the cell assembly B is accommodated and a lower surface exposed to the cooling fluid passage F and may mediate a heat transfer between the cell assembly B and the cooling fluid passage F. The first and second plates P1 and P2 may include the first and second boundary portions P1a and P2a forming the coupling with the main boundary portion M and the first and second exposure portions P1b and P2b exposed from the main boundary portion M, respectively, wherein the cooling fluid passage F may be formed between the first and second exposure portions P1b and P2b. That is, the cooling fluid passage F may be formed between the lower surface of the first exposure portion P1b and an upper surface of the second exposure portion P2b, and a heat radiation pin 11 for increasing a contact area with a cooling fluid flowing through the cooling fluid passage F may be formed on the lower surface of the first exposure portion P1b. For example, the heat radiation pin 11 of the first exposure portion P1b may be formed to protrude toward the second exposure portion P2b facing the first exposure portion P1b and forming the cooling fluid passage F. As described below, the cooling fluid passage F may be formed in the first direction Z1 corresponding to the longitudinal direction of the accommodation space G, and a cooling medium pipe PL for supplying a cooling medium to the cooling fluid passage F or retrieving a cooling medium from the cooling fluid passage F may be arranged on a front surface and a rear surface of the module housing 5 in the first direction Z1. Here, the heat radiation pin 11 formed in the first plate P1 (the first exposure portion P1b) may be formed in the first direction Z1 along the cooling fluid passage F.

The second coupling line L2 may include the coupling between the main outer boundary portion MO and the second boundary portion P2a of the second plate P2. Here, the sealing portion 50 may be arranged between the main outer boundary portion MO and the second boundary portion P2a to mediate the coupling between the main outer boundary portion MO and the second boundary portion P2a. In more detail, the second boundary portion P2a may include a flat plate portion 20 coupled to the main outer boundary portion MO with the sealing portion 50 therebetween and a protrusion step portion 21 formed between the flat plate portion 20 and the second exposure portion P2b. Here, the second boundary portion P2a may be aligned with the main outer boundary portion MO through the protrusion step portion 21 and may form the coupling with the main outer boundary portion MO through the flat plate portion 20.

With respect to the alignment between the second boundary portion P2a and the main outer boundary portion MO, a pair of bump portions 25 formed in the main outer boundary portion MO with the protrusion step portion 21 of the second boundary portion P2a between the pair of bump portions 25 may be inserted into the protrusion step portion 21 of the second boundary portion P2a, and thus, the second boundary portion P2a and the main outer boundary portion MO may be aligned with each other. For example, the pair of bump portions 25 protruding toward both sides of the protrusion step portion 21 may be formed in the lower width W2 covering the lower surface of the first boundary portion P1*a* in the main outer boundary portion MO, and as the pair of bump portions 25 may be inserted into the protrusion step portion 21 arranged between the pair of bump portions 25, the main outer boundary portion MO in which the pair of bump portions 25 are formed and the second boundary portion P2*a* in which the protrusion step portion 21 is formed may be aligned with each other.

The protrusion step portion 21 may include an upper surface upwardly protruding and a lower surface (corresponding to the jig groove 22) which is concave and indented from below. The protrusion step portion 21 may form the alignment with the main outer boundary portion MO through the protruding upper surface and may firmly fix a coupling location of the second plate P2 through the concave lower surface (corresponding to the jig groove 22). Here, the protruding upper surface of the protrusion step portion 21 may contribute to the alignment with the main outer boundary portion MO and, at the same time, may be arranged between the sealing portion 50 and the cooling fluid passage F to prevent or reduce the blockage of the cooling fluid passage F due to a leakage of the sealing member forming the sealing portion 50 into the cooling fluid passage F. The protrusion step portion 21 may be formed between the flat plate portion 20 in which the sealing portion 50 is formed and the first exposure portion P1*b* in which the cooling fluid passage F is formed, and thus, may prevent or reduce the blockage of the cooling fluid passage F due to the leakage of the sealing portion 50.

The protrusion step portion 21 may be formed to have an indented shape including the protruding upper surface and the concave lower surface, and the pressing portion PG of the molding jig may be inserted into the jig groove 22 formed by the concave lower surface. In manufacturing of the module housing 5 according to some embodiments, the primary molding structure in which the main housing H and the first plate P1 including different kind of materials with each other are integrally formed may be formed by primary molding corresponding to insert molding, and then, secondary molding for injecting the sealing member between the primary molding structure and the second plate P2 may be continually performed.

Here, the second plate P2 formed by the primary molding may be slid to a location to touch the primary molding structure, and in a state in which the second plate P2 has a fixed location to touch the primary molding structure, the sealing member for coupling the primary molding structure with the second plate P2 may be injected. Here, to firmly fix the coupling location of the second plate P2 to a right location, the secondary molding may be performed in a state in which the pressing portion PG of the molding jig is inserted into the jig groove 22 of the second plate P2. In the primary molding according to some embodiments, while the primary molding structure in which the main housing H and the first plate P1 are integrally formed with each other is formed, the second plate P2 may be formed, and the sealing member may be injected in a state in which the primary molding structure and the second plate P2 are fixed at locations to touch each other, by making a molding jig of the primary molding structure and a molding jig of the second plate P2 that are apart from each other approach each other. Here, the coupling location of the second plate P2 may be firmly fixed through the pressing portion PG of the molding jig inserted into the jig groove 22 of the second plate P2. When the location of the second plate P2 is misaligned in the secondary molding for forming the sealing portion 50, the cooling fluid passage F formed by the second plate P2 may be leaked, and thus, the coupling location of the second plate P2 may be firmly maintained through the jig groove 22, and the leakage of the cooling fluid passage F may be prevented or reduced.

With respect to the coupling between the second boundary portion P2*a* and the main outer boundary portion MO, the sealing portion 50 may be arranged between the second boundary portion P2*a* and the main outer boundary portion MO, to couple the second boundary portion P2*a* and the main outer boundary portion MO with each other. The sealing portion 50 may fill between the flat plate portion 20 of the second boundary portion P2*a* and the main outer boundary portion MO to couple the flat plate portion 20 and the main outer boundary portion MO with each other. The sealing portion 50 may include a first sealing portion 51 filled between the flat plate portion 20 of the second boundary portion P2*a* and the main outer boundary portion MO and a second sealing portion 52 extending in a direction crossing the first sealing portion 51 and extending across the first sealing portion 51 from a location contacting the outside of the main outer boundary portion MO.

The first sealing portion 51 may generally extend in a surface direction (the second direction Z2) of the flat plate portion 20 or the second plate P2 including the flat plate portion 20 and may be formed between the flat plate portion 20 and the main outer boundary portion MO. The second sealing portion 52 may extend, in the direction crossing the first sealing portion 51, that is, in a generally thickness direction (the third direction Z3) of the flat plate portion 20 or the second plate P2 including the flat plate portion 20, from the location touching the outside of the main outer boundary portion MO to deviate from the first sealing portion 51 across the first sealing portion 51. Here, the first and second sealing portions 51 and 52 may respectively extend in the second and third directions Z2 and Z3 crossing each other. The first sealing portion 51 may be formed between the flat plate portion 20 and the main outer boundary portion MO, and the second sealing portion 52 may extend across the first sealing portion 51 from the location touching the outside of the main outer boundary portion MO.

In this range, it may be sufficient when the first and second sealing portions 51 and 52 extend in directions crossing each other, and the first and second sealing portions 51 and 52 may not have to extend in the surface direction (the second direction Z2) of the flat plate portion 20 or the second plate P2 including the flat plate portion 20 and the thickness direction (the third direction Z3) of the flat plate portion 20 or the second plate P2 including the flat plate portion 20, respectively. That is, according to some embodiments, the first and second sealing portions 51 and 52 may generally respectively extend in the surface direction (the second direction Z2) of the second plate P2 and the thickness direction (the third direction Z3) of the second plate P2. However, the extension direction of the first and second sealing portions 51 and 52 may not necessarily have to be limited thereto, and it may be sufficient when the first and second sealing portions 51 and 52 respectively extend in directions crossing each other.

As described below, the sealing portion 50 may be formed by including a sealing member injected between the main boundary portion M and the second boundary portion P2*a* that are aligned with each other, and the sealing member may be injected from the location touching the outside of the main outer boundary portion MO. That the second sealing portion 52 is formed from the location touching the outside of the main outer boundary portion MO may denote that the main outer boundary portion MO is open to the outside to provide an injection space of the sealing member. For example, the injection space of the sealing member may be formed from the location touching the outside of the main outer boundary portion MO to have a shape aligned with the first and second sealing portions 51 and 52.

The second sealing portion 52 may generally extend in an injection direction of the sealing member, that is, in the third direction Z3, from the location touching the outside, thereby facilitating the injection of the sealing member. The first sealing portion 51 may cross the second sealing portion 52 at a middle location (for example, a location corresponding to an upper surface of the flat plate portion 20) of the second sealing portion 52 in the third direction Z3 and may prevent or reduce the formation of a void that is not filled with the sealing member, according to a flow of the sealing member for a direction switch at a crossing location of the first and second sealing portions 51 and 52. For example, unlike the disclosure, when a crossing location of the first and second sealing portions 51 and 52 is provided at an uppermost location of the second portion 52 in the third direction Z3, a void in which the sealing member is not filled may be formed according to a flow of the sealing member for a direction switch at the crossing location.

The second sealing portion 52 may be formed to touch the outside, and thus, the second sealing portion 52 may include a sealing member having a sealing property for blocking external hazardous materials. The first and second sealing portions 51 and 52 may include the same material as each other by injecting the same sealing member, wherein the sealing member may have an excellent sealing property for blocking external harmful materials.

The second plate P2 may be aligned with the main housing H through the pair of bump portions 25 inserted into the protrusion step portion 21 arranged between the pair of bump portions 25, and the alignment of the second plate P2 may limit a size of the cooling fluid passage F defined by the second plate P2. For example, the cooling fluid passage F may be formed between the first and second plates P1 and P2, that is, between the first and second exposure portions P1b and P2b of the first and second plates P1 and P2. Here, a height of the cooling fluid passage F formed between the first and second exposure portions P1b and P2b may be determined according to the insertion between the protrusion step portion 21 and the pair of bump portions 25. For example, according to the height of the second plate P2 determined according to the insertion between the protrusion step portion 21 and the pair of bump portions 25, the size of the cooling fluid passage F formed between the first plate P1 and the second plate P2 may be determined.

The first and second boundary portions P1a and P2a may form the coupling with the main outer boundary portion MO, and the first and second boundary portions P1a and P2a may be coupled to the main outer boundary portion MO through the recessed holding portion RH of the main outer boundary portion MO and the sealing portion 50, respectively. Also, the first and second boundary portions P1a and P2a may at least partially overlap each other and may overlap the lower width W2 of the main outer boundary portion MO arranged between the first and second boundary portions P1a and P2a.

Referring to FIG. 8, the first coupling line L1 may include the coupling between the main inner boundary portion MI and the first boundary portion P1a of the first plate P1. The first coupling line L1 may form the coupling with two first plates P1 formed at both sides of the main inner boundary portion MI, and accordingly, the first coupling line L1 forming the coupling with the main inner boundary portion MI may include a pair of recessed holding portions RH forming the coupling with the two first plates P1 arranged at both sides of the main inner boundary portion MI. Each of the pair of recessed holding portions RH may form the coupling with either of the first plates P1 and may be formed to have a concave shape to continually cover the upper surface, the lower surface, and the side surface of the first boundary portion P1a of the first plate P1.

Each recessed holding portion RH may include the upper width W1 covering the upper surface of the first boundary portion P1a and the lower width W2 covering the lower surface of the first boundary portion P1a, wherein the lower width W2 may be greater than the upper width W1 in the second direction Z2, and the filling width W3 at which the filling member 30 is formed may be formed on the first boundary portion P1a to deviate from the upper width W1 that is relatively small.

Referring to FIG. 8, the second coupling line L2 may include the coupling between the main inner boundary portion MI and the second boundary portion P2a of the second plate P2. The sealing portion 50 may be arranged between the main inner boundary portion MI and the second boundary portion P2a to mediate the coupling between the main inner boundary portion MI and the second boundary portion P2a. The sealing portion 50 may form the coupling with the second boundary portion P2a formed around the slit S of the second plate P2 and may be formed to have a symmetrical shape so as to be coupled with the second boundary portion P2a formed at both sides of the slit S.

According to some embodiments, the sealing portion 50 may include a third sealing portion 53 extending between the second boundary portion P2a and the main inner boundary portion MI and a fourth sealing portion 54 extending from the slit S of the second plate P2 in a direction crossing the third sealing portion 53. For example, the third sealing portion 53 may extend in the surface direction (the second direction Z2) of the second plate P2, and the fourth sealing portion 54 may extend in the direction crossing the third sealing portion 53, for example, the thickness direction (the third direction Z3) of the second plate P2.

The fourth sealing portion 54 may extend from the slit S of the second plate P2 toward the main inner boundary portion MI in an injection direction (the third direction Z3) of the sealing member to facilitate the injection of the sealing member, and the third sealing portion 53 may cross the fourth sealing portion 54 at a middle location (for example, a location corresponding to the upper surface of the second boundary portion P2a) in the extension direction (the third direction Z3) of the fourth sealing portion 54, that is, a middle location between an uppermost location and a lowermost location of the fourth sealing portion 54 in the third direction Z3 and may prevent or reduce the formation of a void that is not filled with the sealing member, according to a flow of the sealing member for a direction switch at a crossing location of the third and fourth sealing portions 53 and 54. When the third and fourth sealing portions 53 and 54 cross each other at an uppermost location in the extension direction (the third direction Z3) of the fourth sealing portion 54, a void in which the sealing member is not filled may be formed according to a flow of the sealing member for a direction switch. With respect to an injection location of the sealing member, the sealing member may be injected from the slit S of the second plate P2, and an injection space of the sealing member may be formed in the main inner boundary portion MI touching the slit S of the second plate P2, the injection space extending from a location corresponding to the slit S. This injection space of the sealing member may be formed from a location touching the outside (or the slit S of the second plate P2) of the main inner boundary portion MI. For example, the injection space of the sealing member may be formed from the location touching the slit S of the second plate P2 to have a shape aligned with the third and fourth sealing portions 53 and 54.

The third sealing portion 53 may extend in the second direction Z2 from both sides of the fourth sealing portion 54. The third sealing portion 53 may form the coupling of the second boundary portion P2a formed around the slit S and may be formed at both sides of the fourth sealing portion 54 to be coupled with the second boundary portion P2a formed at both sides of the slit S. As described above, the third sealing portion 53 may cross the fourth sealing portion 54 at the middle location (for example, the location corresponding to the upper surface of the second boundary portion P2a) in the extension direction (the third direction Z3) of the fourth sealing portion 54 and may extend from both sides of the fourth sealing portion 54. Generally, the third and fourth sealing portions 53 and 54 may be formed to have a cross shape.

Referring to FIG. 5, the second coupling line L2 for the coupling between the second boundary portion P2a and the main inner boundary portion MI may be formed along the slit S. The second coupling line L2 may not be disconnected at the bridge BR between the slits S adjacent to each other in the first direction Z1 and may be continually formed along all of the slits S and the bridge BR arranged in the first direction Z1. Here, the slit S for injecting the sealing member may not be formed at the bridge BR. However, the sealing member may be injected through the slits S adjacent to each other in the first direction Z1, and the second coupling line L2 may be continually formed along all of the slits S and the bridge BR arranged in the first direction Z1.

The sealing portion 50 (corresponding to an outer sealing portion 50a) described with reference to FIG. 7 may form the coupling with the second boundary portion P2a formed along the edge of the second plate P2 and may be formed have an asymmetrical shape so as to be coupled with one second boundary portion P2a formed at the edge of the second plate P2. For example, the first sealing portion 51 may extend from a side of the second sealing portion 52. Unlike this, the sealing portion 50 (corresponding to an inner sealing portion 50b) described with reference to FIG. 8 may form the coupling with the second boundary portion P2a formed around the slit S of the second plate P2 and may be formed to have a symmetrical shape so as to be coupled with the two second boundary portions P2a formed at both sides of the slit S. For example, the third sealing portion 53 may extend from both sides of the fourth sealing portion 54.

For reference, the sealing portion 50 (the outer sealing portion 50a) formed along the edge of the second plate P2 may include the first sealing portion 51 extending between the main boundary portion M and the second boundary portion P2a and the second sealing portion 52 extending in the direction crossing the first sealing portion 51 and extending across the first sealing portion 51 from the location contacting the outside of the main outer boundary portion MO.

Also, the sealing portion 50 (the inner sealing portion 50b) formed around the slit S of the second plate P2 may include the third sealing portion 53 extending between the main boundary portion M and the second boundary portion P2a and the fourth sealing portion 54 extending from the location touching the slit S of the second plate P2, the location corresponding to the outside of the main boundary portion M, and extending across the third sealing portion 53 in the direction crossing the third sealing portion 53. Here, the first and third sealing portions 51 and 53 may correspond to a first sealing portion of the claims, in that the first and third sealing portions 51 and 53 may extend between the main boundary portion M and the second boundary portion P2a.

Also, the second and fourth sealing portions 52 and 54 may correspond to a second sealing portion of the claims, in that the second and fourth sealing portions 52 and 54 may extend from the location touching the outside of the main boundary portion M and may extend across the first and third sealing portions 51 and 53 (corresponding to the first sealing portion of the claims) in the directions crossing the first and third sealing portions 51 and 53 (corresponding to the first sealing portion of the claims). However, as described above, according to a location of the sealing portion 50, the sealing portion 50 (the outer sealing portion 50a (see FIG. 7)) formed along the edge of the second plate P2 may include the first sealing portion 51 extending from one side of the second sealing portion 52 and may form an asymmetrical cross-section, and the sealing portion 50 (the inner sealing portion 50b (see FIG. 8)) formed around the slit S of the second plate P2 may include the third sealing portion 53 (corresponding to the first sealing portion of the claims) extending from both sides of the fourth sealing portion 54 (corresponding to the second sealing portion of the claims) and may form a symmetrical cross-section.

Referring to FIGS. 7 and 8 together, the protrusion step portion 21 may be formed in the second boundary portion P2a of the second plate P2, and the protrusion step portion 21 may be formed in each of the second boundary portion P2a (the second boundary portion P2a adjacent to the main outer boundary portion MO) formed at the edge of the second plate P2 and the second boundary portion P2a (the second boundary portion P2a adjacent to the main inner boundary portion MI) formed around the slit S of the second plate P2. The protrusion step portion 21 may include the upper surface upwardly protruding and the lower surface which is concave and indented from below, and the concave lower surface of the protrusion step portion 21 may function as the jig groove 22. The protruding upper surface of the protrusion step portion 21 may function as a wall structure for defining the cooling fluid passage F therebetween, and the cooling fluid passage F may be formed between the protrusion step portion 21 formed at the edge of the second plate P2 and the protrusion step portion 21 formed around the slit S of the second plate P2. The protrusion step portion 21 may protect the cooling fluid passage F. For example, the protrusion step portion 21 may prevent or reduce the blockage of the cooling fluid passage F due to a leakage of the sealing portion 50 (the sealing member included in the sealing portion 50) formed around the cooling fluid passage F into the cooling fluid passage F.

The cooling fluid passage F may be formed between the first plate P1 formed for each separate accommodation space G and the second plate P2 arranged to face the first plate P1 and may be formed between the first exposure portion P1b of the first plate P1 and the second exposure portion P2b of the second plate P2. Here, the first exposure portion P1b may define a side of the cooling fluid passage F in the third direction Z3, and the second exposure portion P2b may define the other side of the cooling fluid passage F in the third direction Z3.

Here, the second exposure portion P2b defining the other side of the cooling fluid passage F may correspond to a portion between the protrusion step portion 21 (see FIG. 7) formed at the edge of the second plate P2 and the protrusion step portion 21 (see FIG. 8) formed around the slit S of the second plate P2. The cooling fluid passage F may be separately formed for each accommodation space G, and the first plate P1 may be separately formed for each accommodation space G and may define a side of the cooling fluid passage F. Although the second plate P2 may not be separately formed for each accommodation space G, the second plate P2 may define one cooling fluid passage F from an edge of the second plate P2 to the slit S (the protrusion step portion 21 around the slit S) of the second plate P2 and may define another cooling fluid passage F from the slit S (the protrusion step portion 21 around the slit S) to another edge of the second plate P2. Here, each of a pair of protrusion step portions 21 (the protrusion step portions 21 adjacent to the main inner boundary portion MI) formed around the slit S may form a different cooling fluid passage F from each other. Each of the pair of protrusion step portions 21 formed around the slit S may include an upper surfaces flatly connected to each other, and the slit S between the pair of protrusion step portions 21 may provide an injection location of the sealing member for forming the third and fourth sealing portions 53 and 54.

According to some embodiments, the protrusion step portions 21 formed around the slit S may be formed between the cooling fluid passage F and the sealing portion 50 and may prevent or reduce the blockage of the cooling fluid passage F, which may occur when the sealing member for forming the sealing portion 50 is leaked into the cooling fluid passage F. For example, the upper surface of the protrusion step portion 21 may increase the resistance with respect to a leakage path of the sealing member, and thus, may prevent or reduce the leakage of the sealing member into the cooling fluid passage F.

According to some embodiments, the cooling fluid passage F may extend in the first direction Z1 corresponding to a longitudinal direction of the battery module 1, and the cooling fluid passage F extending in the first direction Z1 may extend across the accommodation spaces G arranged in the first direction Z1 and may cool the cell assemblies B accommodated in the accommodation spaces G.

The module housing 5 according to some embodiments may be formed by DSI. For example, according to the DSI method, the main housing H and the first plate P1 including different kind of materials from each other may be integrally formed with each other through insert molding via primary molding. Here, in the primary molding, together with the insert molding of the main housing H and the first plate P1, molding of the second plate P2 may be performed. For example, in the primary molding, a molding jig for insert molding and a molding jig for the formation of the second plate P2 may undergo molding processes, while being apart from each other, and in secondary molding following the primary molding, at least one of the molding jig for insert molding or the molding jig for the formation of the second plate P2 may slide toward the other so as to be moved to a location, where the primary molding structure in which the main housing H and the first plate P1 are integrally formed with each other touches the second plate P2, and then, the sealing member may be injected through the injection space. Thus, the sealing member 50 mediating the coupling between the first molding structure and the second plate P2 may be formed.

According to some embodiments, in order to increase the coupling power in the secondary molding, the main housing H, the second plate P2, and the sealing portion 50 may be formed by including same kind of resin materials, and, by taking into account the cooling performance with respect to the accommodation space G, the first plate P1 may include a metal material having excellent heat conductivity, such as aluminum. As described above, the module housing 5 according to some embodiments may include a composite material including the metal material and the resin materials.

Hereinafter, by referring to FIG. 4, a structure of the first coupling line L1 forming the coupling between the first plate P1 and the main housing H is described. The first coupling line L1 may be formed along the first boundary portion P1a formed at the edge of the first plate P1 separately formed for each accommodation space G, and accordingly, the first coupling line L1 may form a closed loop surrounding each accommodation space G.

In other words, the first coupling line L1 may be formed along the edge of the first plate P1 separately formed for each accommodation space G to have a shape of a closed loop and, for example, may be formed as four closed loops surrounding the first through fourth accommodation spaces G1 through G4, respectively. For example, according to some embodiments, the first coupling line L1 formed to have the shape of the closed loop may have an angular corner. As described below, the second coupling line L2 may be formed to have a shape of a closed loop along the edge of the second plate P2, and by taking into account the flowing property of the sealing member for forming the sealing portion 50, may have a round corner.

Because the second coupling line L2 may include the sealing portion 50 formed by injecting the sealing member, the second coupling line L2 may have the round corner by taking into account the flowing property of the sealing member. Also, because the first coupling line L1 may include the recessed holding portion RH formed by insert molding, the first coupling line L1 may have the angular corner, unlike the second coupling line L2.

The first coupling line L1 may separately surround each accommodation space G and may be formed as a pair of lines along the slit S of the second plate P2 formed between the adjacent accommodation spaces G, that is, between the first and second accommodation spaces G1 and G2 and between the third and fourth accommodation spaces G3 and G4, adjacent to each other in the second direction Z2. For example, the first coupling line L1 may include a pair of first coupling lines L1 separately surrounding the first and second accommodation spaces G1 and G2 and a pair of first coupling lines L1 separately surrounding the third and fourth accommodation spaces G3 and G4, along the slit S of the second plate P2.

Hereinafter, by referring to FIG. 5, a structure of the second coupling line L2 forming the coupling between the second plate P2 and the main housing H is described. The second coupling line L2 may include the second coupling line L2 formed to have a shape of a closed loop along the second boundary portion P2a formed at the edge of the second plate P2 commonly formed throughout the accommodation spaces G. Here, because the second coupling line L2 may include the sealing portion 50 formed by injecting the sealing member, the second coupling line L2 formed to have the shape of the closed loop may have the round corner, by taking into account the flowing property of the sealing member. For example, the second coupling line L2 having the shape of the closed loop may be formed by making the sealing member flow along the second coupling line L2 with at least one position along the second coupling line L2 as the injection location of the sealing member, and thus, by taking into account the flowing property of the sealing member, the second coupling line L2 may have the round corner.

The second coupling line L2 may include the second coupling line L2 formed to have a stripe shape along the second boundary portion P2a formed around the slit S formed in the second plate P2. Here, the second coupling line L2 may continually extend in the first direction Z1 across the bridge BR between the slits S, without being disconnected in the bridge BR, with the location of the slit S as the injection location of the sealing member. The second coupling line L2 may be formed via injection of the sealing member with at least a position along the second coupling line L2 having the stripe shape as the injection location of the sealing member, and the second coupling line L2 having the stripe shape may be formed by making the sealing member flow in the second direction Z2.

Figure 9:
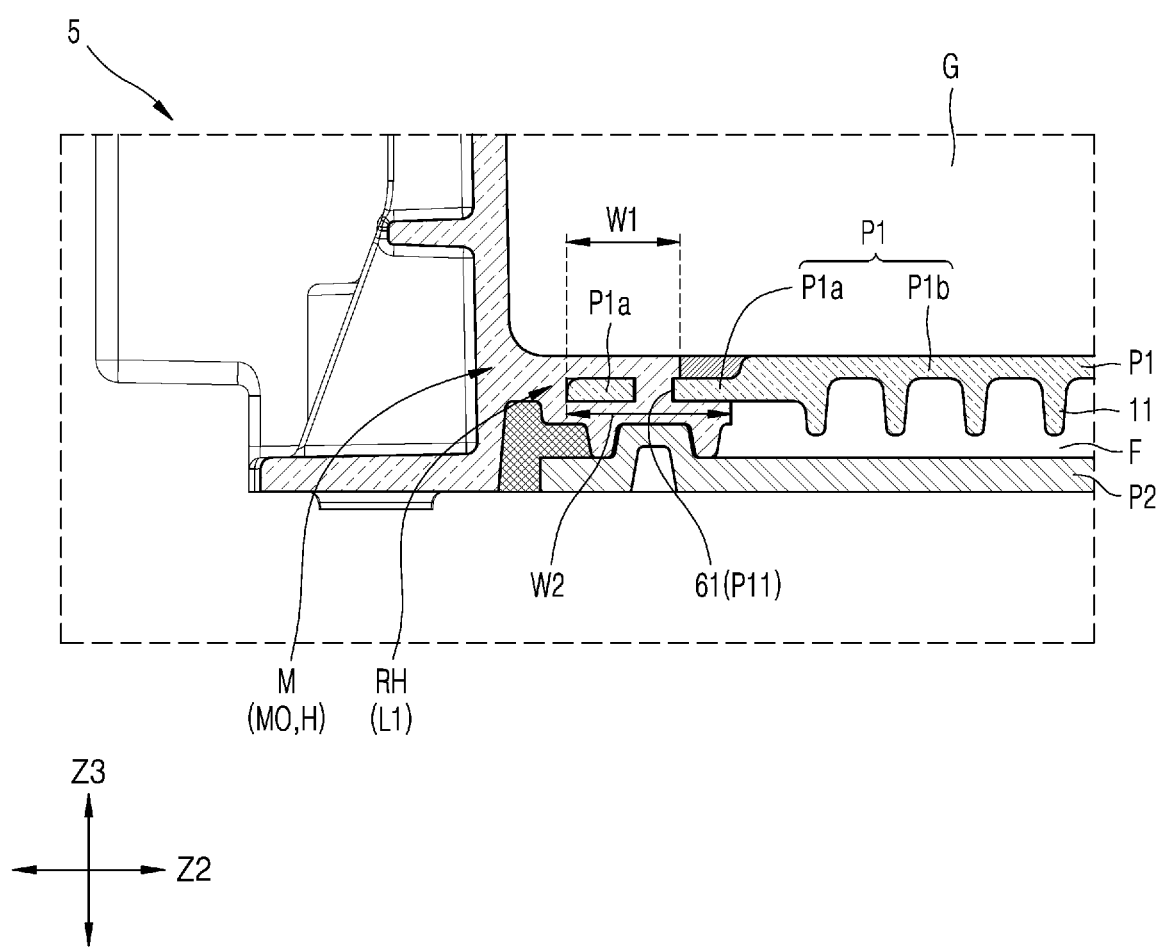
FIG. 9 is a cross-sectional view for describing a matching structure of a module housing, according to some embodiments.
Figure 10:
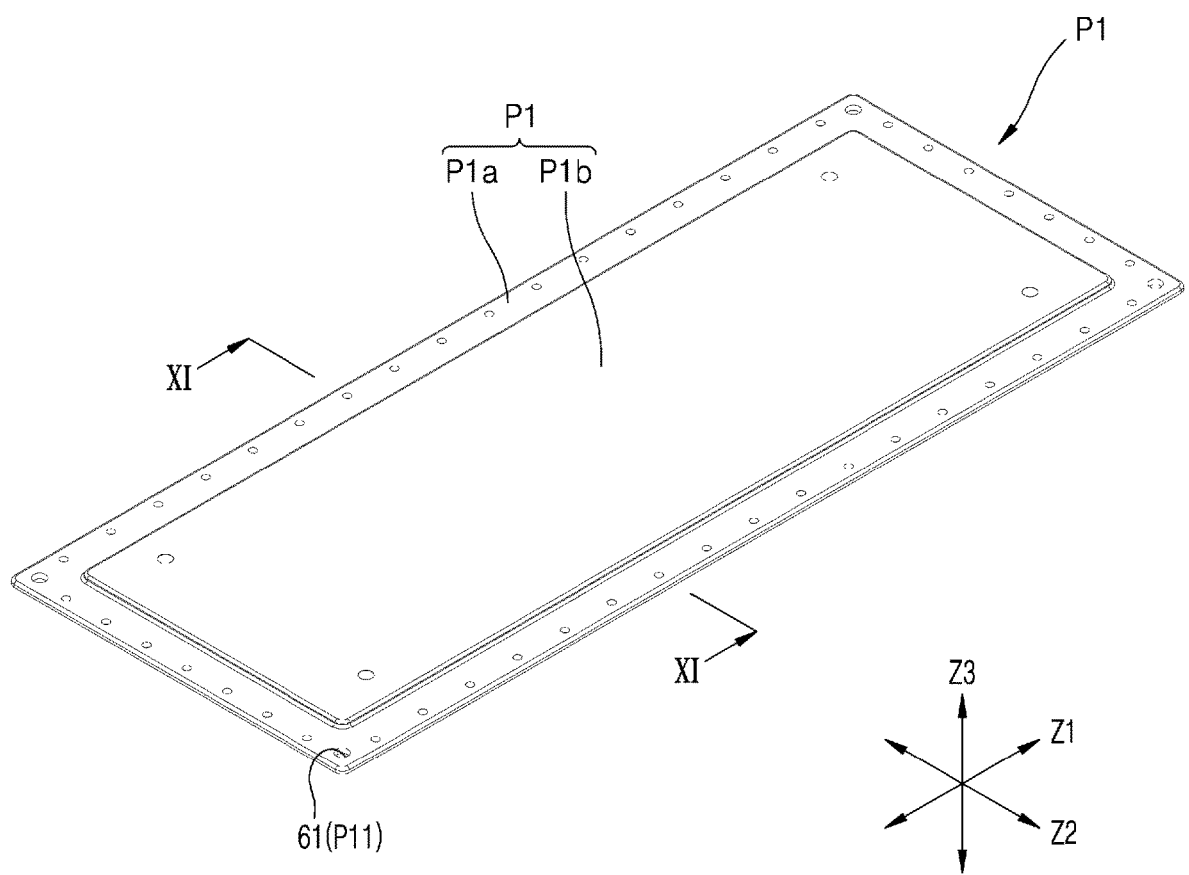
FIG. 10 is a perspective view of a first plate illustrated in FIG. 9.
Figure 11:
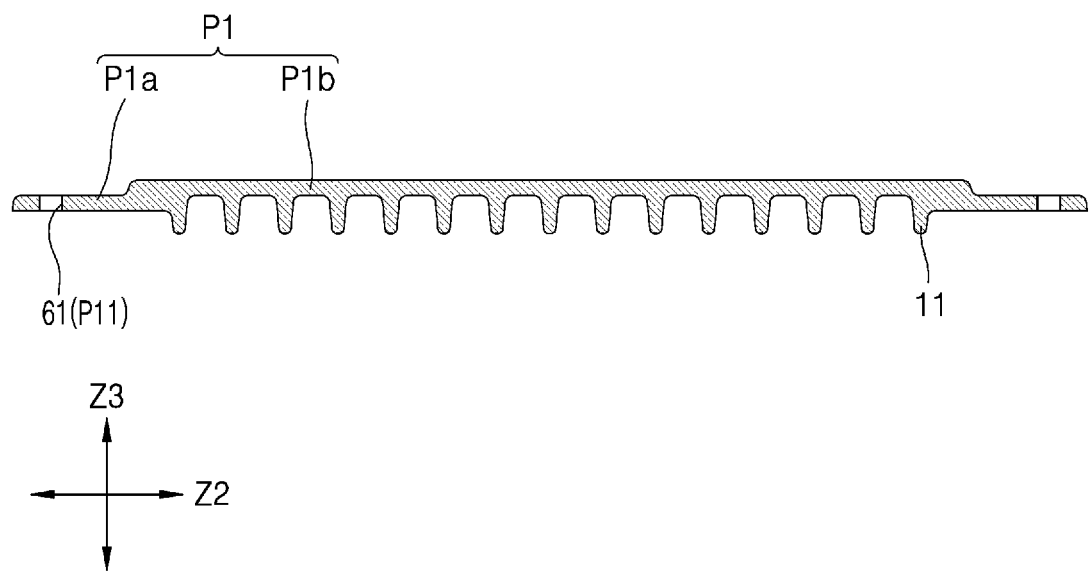
FIG. 11 is a cross-sectional view of the first plate of FIG. 10, taken along a line XI-XI.
Figure 12:
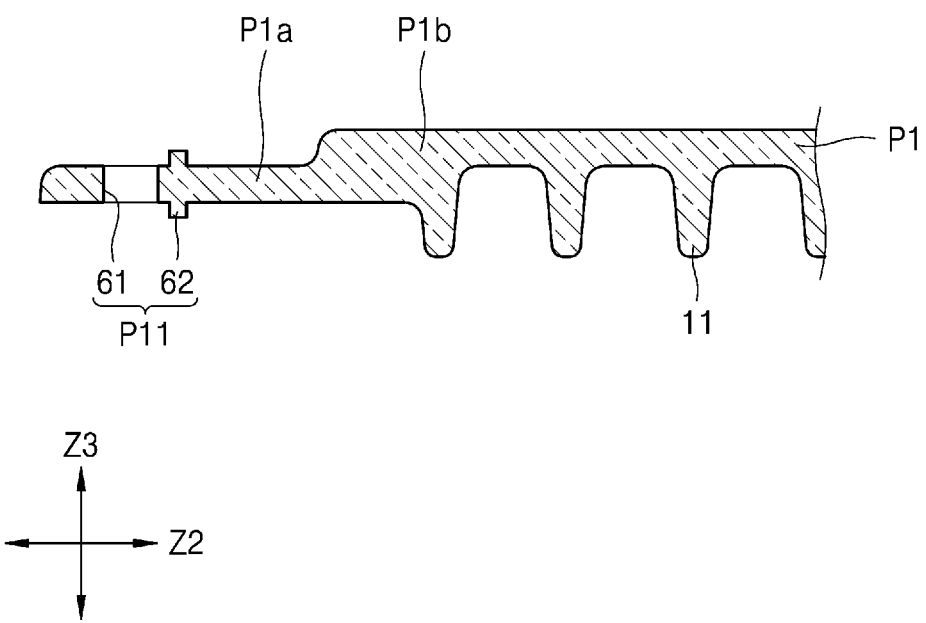
FIG. 12 is a cross-sectional view of the first plate illustrated in FIG. 9, according to some embodiments.
Figure 13:
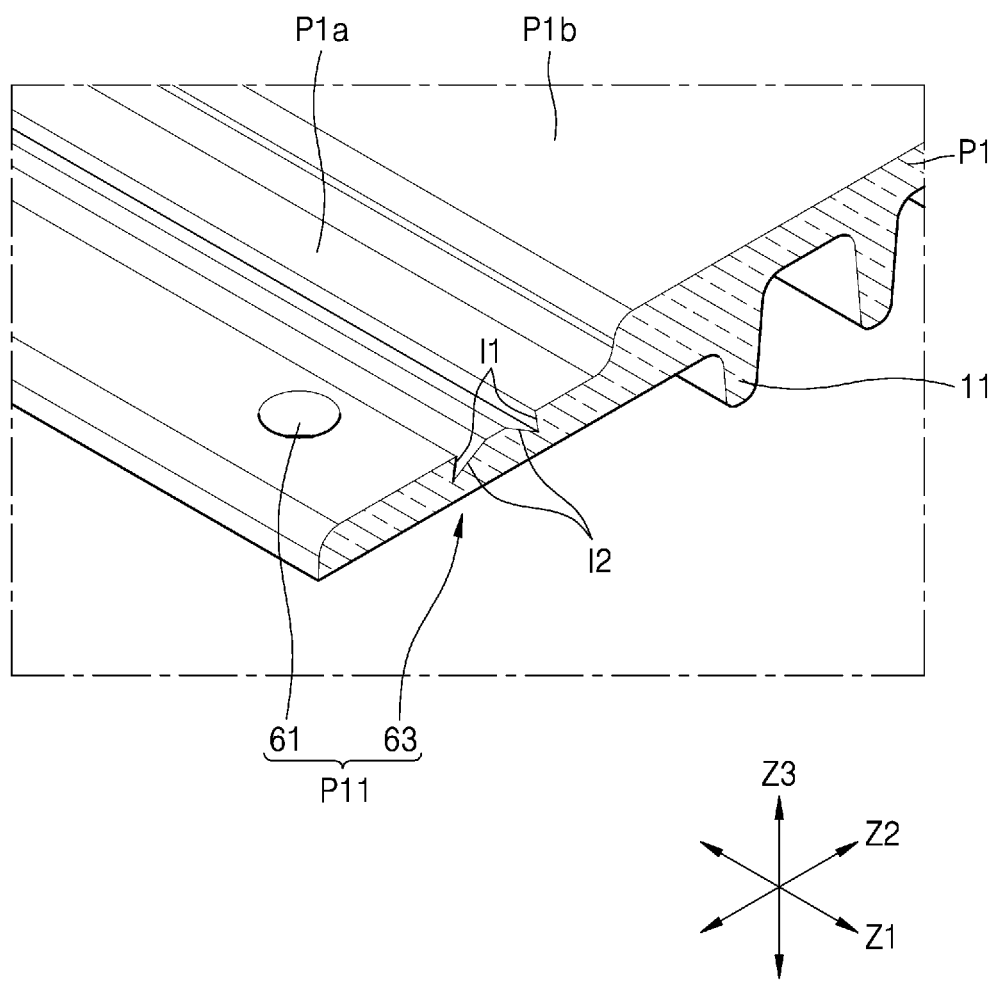
FIG. 13 is a perspective view of the first plate illustrated in FIG. 9, according to some embodiments.

FIG. 9 is a cross-sectional view for describing a matching structure of the module housing 5, according to some embodiments. FIG. 10 is a perspective view of the first plate P1 illustrated in FIG. 9. FIG. 11 is a cross-sectional view of the first plate P1 of FIG. 10, taken along a line XI-XI. FIG. 12 is a cross-sectional view of the first plate P1 illustrated in FIG. 9, according to some embodiments. FIG. 13 is a perspective view of the first plate P1 illustrated in FIG. 9, according to some embodiments.

Referring to the drawings, the module housing 5 according to some embodiments may include a matching structure P11 between the first boundary portion P1a and the main boundary portion M, as a structure for reinforcing the coupling power between the first plate P1 and the main housing H formed by insert molding. Here, the matching structure P11 between the first boundary portion P1a and the main boundary portion M may denote a matching structure in which the first boundary portion P1a and the main boundary portion M that are integrally formed with each other by insert molding are inserted to each other by having a complementary shape so as not to be detached from each other. In more detail, according to various embodiments, a hole 61, a protrusion portion 62, and a concave-convex pattern 63 may be formed along the first boundary portion P1a formed at the edge of the first plate P1, and the hole 61, the protrusion portion 62, and the concave-convex pattern 63 formed along the first boundary portion P1a may be filled with or buried by portions of the main housing H formed to have complementary shapes thereto and may form an interface with the main housing H. Here, the hole 61, the protrusion portion 62, and the concave-convex pattern 63 formed in the first boundary portion P1a may be filled with or buried by the portions of the main housing H formed to have the complementary shapes thereto or may form the interface with the main housing H, and thus, the first boundary portion P1a and the main housing H may be firmly coupled with each other. Here, the portions of the main housing H forming the physical interference with the hole 61, the protrusion portion 62, and the concave-convex pattern 63 formed in the first boundary portion P1a may denote at least one of the upper width W1 or the lower width W2 of the recessed holding portion RH forming the coupling with the first boundary portion P1a, the upper width W1 covering the upper surface of the first boundary portion P1a and the lower width W2 covering the lower surface of the first boundary portion P1a. The at least one of the upper width W1 or the lower width W2 of the recessed holding portion RH may fill or bury the hole 61, the protrusion portion 62, and the concave-convex pattern 63 formed in the first boundary portion P1a or may form the interface therewith, thereby forming the solid coupling with the first plate P1.

For example, as illustrated in FIG. 12, the protrusion portion 62 protruding in both upper and lower directions in the first boundary portion P1a may form the matching structure P11 with the upper width W1 and the lower width W2 of the recessed holding portion RH. For example, a groove shape that is complementary with the shape of the protrusion portion 62 may be formed in each of the upper width W1 and the lower width W2 so as to bury the protrusion portion 62. Also, as illustrated in FIG. 13, the concave-convex pattern 63 upwardly formed in the first boundary portion P1a may form the matching structure P11 with the upper width W1 of the recessed holding portion RH. For example, a complementary wedge shape with respect to the concave-convex pattern 63 may be formed in the upper width W1 so as to form an inclined interface with the concave-convex pattern 63. As illustrated in FIG. 9, the hole 61 formed in the first boundary portion P1a may be filled with a bump shape extending from the upper width W1 and the lower width W2 of the recessed holding portion RH. The bump shape extending from the upper width W1 and the lower width W2 of the recessed holding portion RH may fill the hole 61 of the first boundary portion P1a and may form the matching structure P11.

Hereinafter, the matching structure P11 between the first plate P1 and the main housing H is described in more detail.

Referring to FIGS. 9 through 11, the hole 61 filled with a portion of the main boundary portion M may be formed in the first boundary portion P1a formed along the edge of the first plate P1. According to some embodiments, the hole 61 formed in the first boundary portion P1a may be formed along the edge of the first plate P1 and may be generally formed along the first coupling line L1 forming the coupling with the first boundary portion P1a formed at the edge of the first plate P1. A portion of the main boundary portion M, the portion being formed to have a complementary shape to the hole 61 of the first boundary portion P1a, may be filled in the hole 61, to improve the coupling intensity between the first boundary portion P1a and the main boundary portion M. In more detail, the first plate P1 and the main housing H may be formed together by insert molding. Here, in the insert molding, melt resins forming the main housing H may be filled in the hole 61 formed in the first boundary portion P1a of the first plate P1, and thus, the main boundary portion M may fill the hole 61 of the first boundary portion P1a. Here, the main boundary portion M may be formed to have a complementary shape so as to fill the hole 61 of the first boundary portion P1a, and thus, the main boundary portion M and the hole 61 of the first boundary portion P1a may be matched and may be firmly coupled with each other.

The first plate P1 may form the cooling fluid passage F with the second plate P2. When the first plate P1 floats due to high pressure of a cooling medium flowing through the cooling fluid passage F, the cooling medium may be leaked, and thus, it is required to solidly fix the location of the first plate P1 and increase the coupling power between the first plate P1 and the main housing H. Accordingly, according to some embodiments, a plurality of holes 61 may be formed along the edge of the first plate P1 to be matched via the insert molding, and thus, the coupling intensity between the first plate P1 and the main housing H may be increased, and the leakage of the cooling fluid passage F formed by the first plate P1 may be prevented or reduced. A plurality of cooling pins 11 protruding toward the cooling fluid passage F may be formed in the first exposure portion P1b of the first plate P1 defining a side of the cooling fluid passage F. According to some embodiments, the plurality of heat radiation pins 11 may extend in the first direction Z1 in which the cooling fluid passage F extends, wherein the first direction Z1 in which the cooling fluid passage F extends may correspond to a longitudinal direction of the accommodation space G.

Referring to FIG. 12, the protrusion portion 62 may be formed around the hole 61 formed in the edge of the first plate P1. The protrusion portion 62 may be formed along the first boundary portion P1a formed in the edge of the first plate P1. According to some embodiments, the protrusion portion 52 may be generally formed along the first coupling line L1 formed along the edge of the first plate P1. The protrusion portion 62 may reinforce the coupling power provided by insert molding between the first boundary portion P1a and the main boundary portion P, similarly to the hole 61 formed along the edge of the first plate P1. For example, the protrusion portion 62 formed to protrude from the edge of the first plate P1 in the thickness direction (the third direction Z3) may be matched with the main boundary portion M burying the protrusion portion 62 by having a shape that is complementary to the shape of the protrusion portion 62, and a groove having a shape that is complementary to the shape of the protrusion portion 62 of the first boundary portion P1a may be formed in the main boundary portion M, so that the first boundary portion P1a and the main boundary portion M may be matched with each other. According to some embodiments, that the main boundary portion M buries the protrusion portion 62 by having the complementary shape with respect to the protrusion portion 62 may denote that the main boundary portion M may be formed to have the complementary shape with respect to the protrusion portion 62 so as to entirely surround the protrusion portion 62 so that the protrusion portion 62 may not be exposed.

According to some embodiments, the protrusion portion 62 may protrude in both upper and lower directions in the thickness direction (the third direction Z3) of the first plate P1, and the groove for accommodating the protrusion portion 62 may be formed in the main boundary portion M both above and below the first plate P1. According to some embodiments, the protrusion portion 62 may be formed around the hole 61 formed along the edge of the first plate P1. For example, the protrusion portion 62 may be formed more inside than the hole 61 formed in the edge of the first plate P1. However, according to some embodiments, the protrusion portion 62 may be formed along the edge of the first plate P1, in which the hole 61 may not be formed, and regardless of the presence of the hole 61, the protrusion portion 62 may form a matching structure between the first boundary portion P1a and the main boundary portion M and may increase the coupling intensity therebetween.

Referring to FIG. 13, the concave-convex pattern 63 forming the inclined interface with the main boundary portion M may be formed in the edge of the first plate P1. For example, the concave-convex pattern 63 may be formed along the edge of the first plate P1 and, for example, may be generally formed along the first coupling line L1 formed at the edge of the first plate P1. According to some embodiments, the concave-convex pattern 63 may form the interface with the main boundary portion M having the complementary shape with respect thereto and may form at least one inclined interface. For example, the concave-convex pattern 63 may form an inclined interface in the second direction Z2. In more detail, the concave-convex pattern 63 may form a first pair of inclined interfaces I1, each of which is inclined to face each other, and according to some embodiments, the concave-convex pattern 63 may form an inclined interface having a dovetail shape with the main boundary portion M. For example, the concave-convex pattern 63 may form the first pair of inclined interfaces I1, each of which is inclined to face each other, wherein the first pair of inclined interfaces I1 includes an inclined interface having an inclination of about 45 degrees in the second direction Z2 and an inclined interface having an inclination of about −45 degrees in the second direction Z2. Here, that each of the first pair of inclined interfaces I1 included in the concave-convex pattern 63 is inclined to face each other may denote that each of the first pair of inclined interfaces I1 may have an inclination continually approaching each other in the thickness direction (the third direction Z3) of the first plate P1 from a lower location to an upper location. In other words, each of the first pair of inclined interfaces I1 included in the concave-convex pattern 63 may have the inclination continually approaching each other from the lower location to the upper location in a direction opposite to the second plate P2. As described above, through the interfaces having the inclinations approaching each other from the lower location toward the upper location, the detachment of a portion of the main housing H formed between the first pair of inclined interfaces I1 through the first pair of inclined interfaces I1 may be effectively prevented or reduced.

The concave-convex pattern 63 may be configured to reinforce the coupling intensity between the first plate P1 and the main housing H that are integrally formed with each other by insert molding. The main housing H may fill the concave-convex pattern 63 of the first plate P1 by having the complementary shape with respect thereto and may provide the matching structure. According to some embodiments, the concave-convex pattern 63 may be formed at the edge of the first plate P1 together with the hole 61. For example, according to some embodiments, the hole 61 filled with the main boundary portion M and the concave-convex pattern 63 may be formed together at the edge (the first boundary portion P1a) of the first plate P1. Here, the concave-convex pattern 63 may be formed more inside than the hole 61 formed in the edge of the first plate P1. However, according to some embodiments, the concave-convex pattern 63 may be formed along the edge of the first plate P1, in which the hole 61 may not be formed, and regardless of the presence of the hole 61, the concave-convex pattern 63 may form a matching structure between the first boundary portion P1a and the main boundary portion M and may increase the coupling intensity therebetween.

According to some embodiments, the concave-convex pattern 63 may include the first pair of inclined interfaces I1, each of which is inclined to face each other, and a second pair of inclined interfaces I2, each of which is inclined to face each other between the first pair of inclined interfaces I1, each of which is inclined to face each other. Here, that each of the first pair of inclined interfaces 1 and the second pair of inclined interfaces I2 are inclined to face other may denote that each of the first pair of inclined interfaces I1 and the second pair of inclined interfaces I2 may have inclinations approaching each other from a lower location to an upper location in the thickness direction (the third direction Z3) of the first plate P1. Here, the first pair of inclined interfaces I1 may include an interface inclined by an inclination of about 45 degrees in the second direction Z2 and an interface inclined by an inclination of about −45 degrees in the second direction Z2, and the second pair of inclined interfaces I2 may include inclined interfaces having a greater downward inclination toward the second plate P2 than the first pair of inclined interfaces. For example, the second pair of inclined interfaces I2 may include the inclined interfaces having greater inclinations than 45 degrees and −45 degrees. According to some embodiments, while each of the first pair of inclined interfaces I1 and each of the second pair of inclined interfaces I2 may have the inclination approaching each other from the lower location toward the upper location in the direction opposite to the second plate P2, the second pair of inclined interfaces I2 may have a greater inclination toward the second plate P2 than the first pair of inclined interfaces I1.

With respect to the concave-convex pattern 63 including the first pair of inclined interfaces I1 and the second pair of inclined interfaces I2, the main housing H may have a complementary shape with respect to the concave-convex pattern 63, for example, a complementary shape including a wedge shape formed between an interface of the first pair of inclined interfaces I1 and an interface of the second pair of inclined interfaces I2 in the second direction Z2 and another wedge shape formed between the other interface of the first pair of inclined interfaces I1 and the other interface of the second pair of inclined interfaces I2, and may be matched with the concave-convex pattern 63, so as to increase the coupling intensity between the first plate P1 including the concave-convex pattern 63 and the main housing H, provided via the insert molding.

Figure 14:
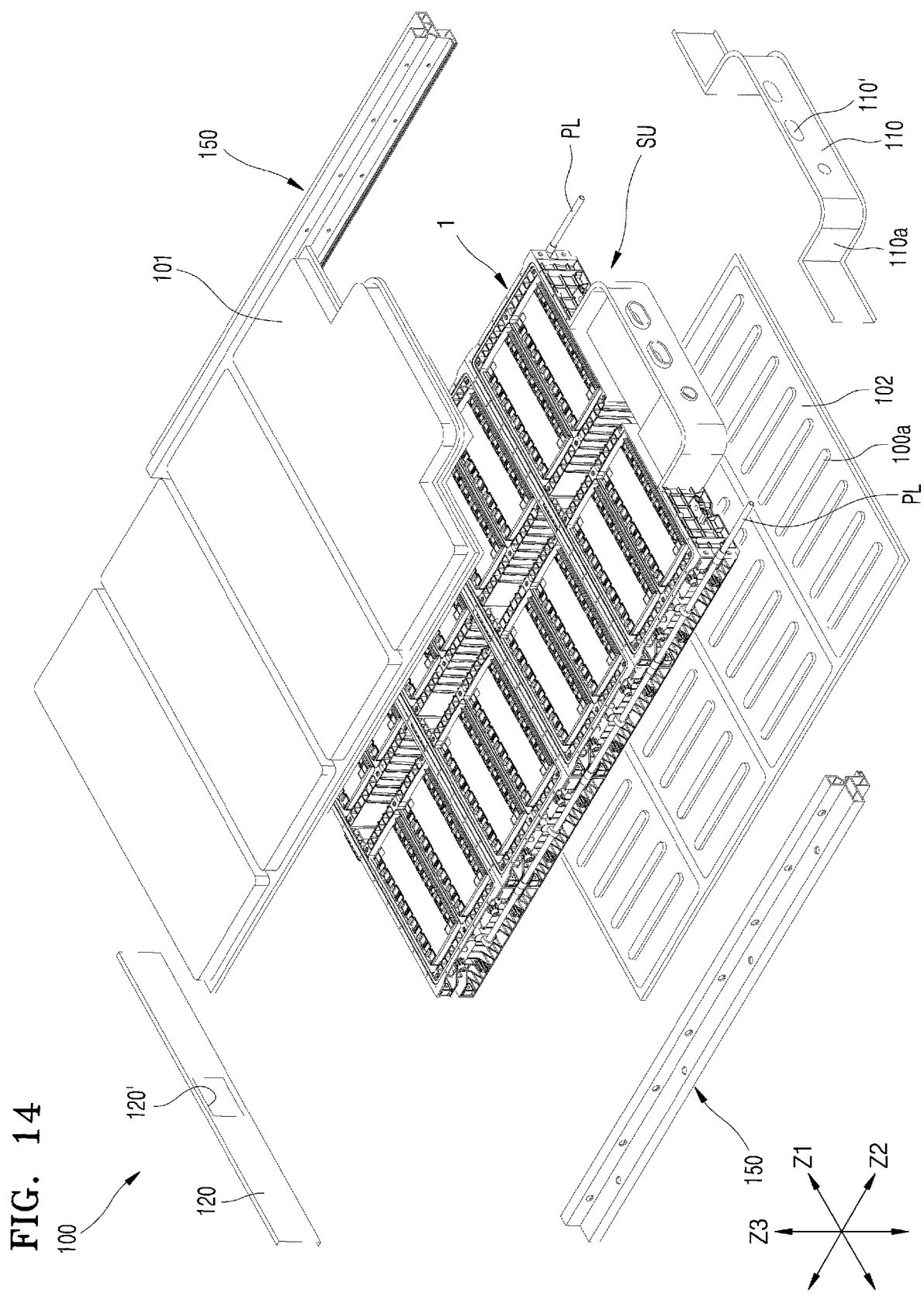
FIG. 14 is a view of a power supply including the battery module illustrated in FIG. 1, according to some embodiments.

FIG. 14 is a view of a power supply 100 including the battery module 1 illustrated in FIG. 1, according to some embodiments.

Referring to FIG. 14, the power supply 100 may include a power supply portion SU and first and second metal plates 101 and 102 arranged at one or more sides of the power supply portion SU. The power supply portion SU may include one or more battery modules 1 illustrated in FIG. 1. According to some embodiments, the power supply portion SU may include a plurality of battery modules 1 arranged in the second direction Z2. According to some embodiments, the first and second metal plates 101 and 102 may be arranged on an upper surface and a lower surface of the power supply portion SU, respectively. Here, the upper surface and the lower surface of the power supply portion SU may denote a surface forming an upper portion of the power supply portion SU and forming a lower portion of the power supply portion SU in the third direction Z3, respectively.

The first and second metal plates 101 and 102 may block electromagnetic waves noise irradiated from the power supply portion SU and electromagnetic waves noise approaching the power supply portion SU, so as to prevent or reduce instances of a malfunction of the power supply 100 and a malfunction of a device in which the power supply 100 is equipped. According to some embodiments, the first and second metal plates 101 and 102 may include a steel material.

A plurality of beads 100a for absorbing shocks may be formed in the first and second metal plates 101 and 102. For example, according to some embodiments, the plurality of beads 100a may be formed in at least one of the first or second metal plates 101 or 102, for example, the second metal plate 102 arranged in a relatively lower location in the third direction Z3 to support the power supply portion SU from below. Here, each bead 100a may be separately formed for each battery module 1 included in the power supply portion SU and may be formed in a disconnected fashion for each battery module 1. The beads 100a formed in the first and second metal plates 101 and 102 may absorb external shocks applied in the third direction Z3 and may absorb shocks applied to the battery module 1. For example, the power supply 100 according to some embodiments may be mounted in a vehicle as driving power of the vehicle and may protect the battery module 1 from shocks applied during driving of the vehicle. Here, the beads 100a formed in the first and second metal plates 101 and 102 may be formed for each battery module 1 in a disconnected fashion, and thus, may function such that shocks applied to another adjacent battery module 1 may not be delivered to another adjacent battery module 1 through the beads 100a. For example, the beads 100a may be formed to have a stripe shape extending in the second direction Z2 and may be formed in a disconnected fashion for each battery module 1 in the second direction Z2. The beads 100a may be configured to protect the battery module 1 and may be formed on inner surface of the first and second metal plates 101 and 102 toward the battery module 1.

According to some embodiments, the power supply 100 may include reinforcement frames 110, 120, and 150 arranged at side portions connecting an upper surface with a lower surface of the power supply portion SU. For example, a front reinforcement frame 110, a rear reinforcement frame 120, and a side reinforcement frame 150 may be arranged on a front surface, a rear surface, and a side surface of the power supply portion SU, respectively. The reinforcement frames 110, 120, and 150 may include a metal material and may provide noise prevention or reduction together with the first and second metal plates 101 and 102. For example, the reinforcement frames 110, 120, and 150 may include the same steel material as the first and second metal plates 101 and 102. Here, the front surface and the rear surface of the power supply portion SU may denote a surface forming a front portion of the power supply portion SU and forming a rear portion of the power supply portion SU in the second direction Z2, respectively. Also, the side surface of the power supply portion SU may denote a side surface extending in the second direction Z2 and connecting the front surface with the rear surface of the power supply portion SU.

According to some embodiments, the front surface and the rear surface of the power supply portion SU may correspond to a short side of the power supply portion SU or a long side of the battery module 1, and the side surface of the power supply portion SU may correspond to a long side of the power supply portion SU or a short side of the battery module 1. For example, according to some embodiments, the power supply portion SU may include the plurality of battery modules 1 arranged in the second direction Z2 such that long sides of the battery modules 1 extending in the first direction Z1 may face each other, and accordingly, the power supply portion SU may include the short side corresponding to the long side of the battery modules 1 extending in the first direction Z1 and the long side extending in the second direction Z2 in which the battery modules 1 are arranged. In other words, the long side of the power supply portion SU may correspond to the short side of each battery module 1, and the short side of the power supply portion SU may correspond to the long side of each battery module 1.

Throughout the specification, the front surface and the rear surface of the power supply portion SU or the front surface and the rear surface of the battery module 1 may denote the short side at both ends in a longitudinal direction of the power supply portion SU or a longitudinal direction of the battery module 1, and the side surface of the power supply portion SU or the side surface of the battery module 1 may denote the long side extending in the longitudinal direction of the power supply portion SU or the longitudinal direction of the battery module 1. Thus, the front reinforcement frame 110 and the rear reinforcement frame 120 arranged on the front surface and the rear surface of the power supply portion SU corresponding to the short sides of the power supply portion SU may be arranged on the side surface of the battery module 1 corresponding to the long side of the battery module 1. Also, the side reinforcement framed 150 arranged on the side surface of the power supply portion SU corresponding to the long side of the power supply portion SU may be arranged on the front surface and the rear surface of the battery module 1 corresponding to the short sides of the battery module 1.

The front reinforcement frame 110 may include an accommodation portion having a shape protruding in a front direction in order to accommodate a battery management system BMS, and thus, a bent portion 110a for accommodating the accommodation portion may be formed in the front reinforcement frame 110. Also, a contact hole 110' for electrical connection with the battery management system BMS may be formed in the front reinforcement frame 110.

A vent hole 120' may be formed in the rear reinforcement frame 120. For example, the power supply 100 according to some embodiments may be equipped in a vehicle as driving power of the vehicle, and the front surface and the rear surface of the power supply 100 may be arranged toward a front surface and a rear surface of the vehicle, respectively. Accordingly, an exhaust gas discharged through the vent hole 120' of the rear reinforcement frame 120 may be discharged to the outside through a vent pipe at a rear portion of the vehicle.

The reinforcement frames 110, 120, and 150 may prevent or reduce electromagnetic waves noise together with the first and second metal plates 101 and 102 and may also protect the power supply portion SU. For example, in the power supply 100 equipped in the vehicle, with respect to external shocks applied toward the front surface and the rear surface of the power supply 100, a degree of absorption (e.g., a set or predetermined degree of absorption) of the external shocks may be expected through a bumper arranged at the front surface and the rear surface of the vehicle. However, with respect to external shocks applied to the side surface of the power supply 100, absorption of the shocks may be hardly expected, and thus, it may be required that the power supply 100 directly include a shock alleviation structure. Accordingly, the power supply 100 according to the disclosure may implement the side reinforcement frame 150 having an improved reinforcement structure, compared to the front reinforcement frame 110 and the rear reinforcement frame 120. For reference, the power supply 100 according to some embodiments may be arranged in the vehicle such that the front surface, the rear surface, and the side surface of the power supply 100 are toward the front surface, the rear surface, and the side surface of the vehicle, respectively, and accordingly, the bumper arranged on the front surface and the rear surface of the vehicle may alleviate the external shocks applied toward the front surface and the rear surface of the power supply 100.

According to some embodiments, the front reinforcement frame 110 and the rear reinforcement frame 120 may be formed to have a metal strip shape, and the side reinforcement frame 150 may be formed at least not to have the metal strip shape and may have a closed cross-section, in order to provide better shock absorption than the front reinforcement frame 110 and the rear reinforcement frame 120.

For example, the side reinforcement frame 150 may be arranged on the side surface of the power supply portion SU. For example, the side reinforcement frame 150 may be arranged as a pair at both side surfaces of the power supply portion SU, the both sides facing each other in the first direction Z1. Here, the side surface of the power supply portion SU, on which the side reinforcement frame 150 is arranged, may correspond to the long side of the power supply portion SU and may correspond to the front surface and the rear surface of the battery module 1 corresponding to the short sides of the battery module 1. That is, the side reinforcement frames 150 may extend in the first direction Z1 and may extend across the front surface and the rear surface of the plurality of battery modules 1 arranged in the second direction Z2.

The side reinforcement frame 150 according to some embodiments may surround a cooling medium pipe PL arranged on the side surface of the power supply portion SU. According to some embodiments, the side reinforcement frame 150 may partially surround the cooling medium pipe PL and may surround a portion of the cooling medium pipe PL arranged on the side that is opposite to the power supply portion SU. For example, the cooling medium pipe PL may be connected to the cooling fluid passage F provided in each battery module 1, and the cooling medium pipe PL may extend across the plurality of cooling fluid passages F included in the battery modules 1, respectively, to supply a cooling medium to the plurality of cooling fluid passages F or retrieve the cooling medium from the plurality of cooling fluid passages F. In more detail, the cooling medium pipe PL may extend in the second direction Z2 in which the plurality of battery modules 1 are arranged and may diverge in the first direction Z1 at a location corresponding to each battery module 1 or the cooling fluid passage F provided in each battery module 1 and supply or retrieve the cooling medium to or from the cooling fluid passage F extending in each battery module 1 in the first direction Z1 corresponding to the longitudinal direction of the battery module 1.

According to the disclosure, a battery module is provided, which has a module housing that provides relatively high cooling performance and additionally may have a relatively reduced weight by applying a composite material including different kinds of materials.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery module comprising:
   one or more cell assemblies;
   a main housing comprising a main boundary portion surrounding an accommodation space in which the one or more cell assemblies are positioned;
   a first plate comprising a first boundary portion coupled with the main boundary portion and a first exposure portion exposed from the main boundary portion and defining a side of a cooling fluid passage for cooling the accommodation space; and
   a second plate facing the first plate and comprising a second boundary portion coupled with the main boundary portion and a second exposure portion exposed from the main boundary portion and defining an other side of the cooling fluid passage, wherein the second boundary portion includes a first portion located along an edge of the second plate and a second portion located around a slit provided in the second plate, wherein the main boundary portion and the second boundary portion are coupled with each other by a first portion of a second coupling line located along the edge of the second plate and a second portion of the second coupling line located around the slit in the second plate, wherein the second coupling line includes a sealing portion located between the main boundary portion and the second boundary portion, wherein the sealing portion includes:

a first sealing portion extending between the main boundary portion and the second boundary portion; and a second sealing portion extending from a location touching an outside of the main boundary portion across the first sealing portion in a direction crossing the first sealing portion.

2. The battery module of claim 1, wherein the first sealing portion and the second sealing portion cross each other in a middle location between an uppermost location and a lowermost location in the direction in which the second sealing portion extends.

3. The battery module of claim 1, wherein an outer sealing portion for coupling between a main outer boundary portion of the main boundary portion and the second boundary portion includes the first sealing portion extending from a side of the second sealing portion and has an asymmetrical cross-section, and an inner sealing portion for coupling between a main inner boundary portion of the main boundary portion and the second boundary portion includes the first sealing portion extending from both sides of the second sealing portion and has a symmetrical cross-section.

4. The battery module of claim 1, wherein the second boundary portion includes a flat plate portion coupled with the main boundary portion with the sealing portion between the flat plate portion and the main boundary portion, and a protrusion step portion provided between the flat plate portion and the second exposure portion.

5. The battery module of claim 4, wherein the protrusion step portion includes an upper surface upwardly protruding and a lower surface that is concave and indented from below.

6. The battery module of claim 5, wherein an upper surface of the protrusion step portion is aligned with the main boundary portion by being inserted into a pair of bump portions, which protrude from both sides of the protrusion step portion in the main boundary portion such that the protrusion step portion is between the pair of bump portions.

7. The battery module of claim 5, wherein a lower surface of the protrusion step portion has a jig groove having a concave shape.

8. A battery module comprising:

one or more cell assemblies;

a main housing comprising a main boundary portion surrounding an accommodation space in which the one or more cell assemblies are positioned;

a first plate comprising a first boundary portion coupled with the main boundary portion and a first exposure portion exposed from the main boundary portion and defining a side of a cooling fluid passage for cooling the accommodation space; and a second plate facing the first plate and comprising a second boundary portion coupled with the main boundary portion and a second exposure portion exposed from the main boundary portion and defining an other side of the cooling fluid passage, wherein the second boundary portion includes a first portion located along an edge of the second plate and a second portion located around a slit provided in the second plate, wherein the main boundary portion and the second boundary portion are coupled with each other by a first portion of a second coupling line located along the edge of the second plate and a second portion of the second coupling line located around the slit in the second plate, wherein the second coupling line includes a sealing portion located between the main boundary portion and the second boundary portion, wherein the sealing portion includes:

a first sealing portion extending between the main boundary portion and the second boundary portion; and a second sealing portion extending from a location touching an outside of the main boundary portion across the first sealing portion in a direction crossing the first sealing portion.

9. The battery module of claim 8, wherein the first sealing portion and the second sealing portion cross each other in a middle location between an uppermost location and a lowermost location in the direction in which the second sealing portion extends.

10. The battery module of claim 8, wherein an outer sealing portion for coupling between a main outer boundary portion of the main boundary portion and the second boundary portion includes the first sealing portion extending from a side of the second sealing portion and has an asymmetrical cross-section, and an inner sealing portion for coupling between a main inner boundary portion of the main boundary portion and the second boundary portion includes the first sealing portion extending from both sides of the second sealing portion and has a symmetrical cross-section.

11. The battery module of claim 8, wherein the second boundary portion includes a flat plate portion coupled with the main boundary portion with the sealing portion between the flat plate portion and the main boundary portion, and a protrusion step portion provided between the flat plate portion and the second exposure portion.

12. The battery module of claim 11, wherein the protrusion step portion includes an upper surface upwardly protruding and a lower surface that is concave and indented from below.

13. The battery module of claim 12, wherein an upper surface of the protrusion step portion is aligned with the main boundary portion by being inserted into a pair of bump portions, which protrude from both sides of the protrusion step portion in the main boundary portion such that the protrusion step portion is between the pair of bump portions.

14. The battery module of claim 12, wherein a lower surface of the protrusion step portion has a jig groove having a concave shape.

* * * * *